United States Patent
Shimizu

(10) Patent No.: US 7,187,495 B2
(45) Date of Patent: Mar. 6, 2007

(54) METHOD OF MANUFACTURING A SCREEN MEMBER FOR A TRANSMISSION SCREEN, A SCREEN MEMBER FOR A TRANSMISSION SCREEN, A TRANSMISSION SCREEN AND A REAR PROJECTION

(75) Inventor: Nobuo Shimizu, Suwa (JP)

(73) Assignee: Seiko Epson Corporation (JP)

( * ) Notice: Subject to any disclaimer, the term of this patent is extended or adjusted under 35 U.S.C. 154(b) by 139 days.

(21) Appl. No.: 10/935,711

(22) Filed: Sep. 7, 2004

(65) Prior Publication Data

US 2005/0083572 A1    Apr. 21, 2005

(30) Foreign Application Priority Data

Sep. 8, 2003   (JP)   ............... 2003-316016

(51) Int. Cl.
G03B 21/56    (2006.01)
G03B 21/60    (2006.01)
G02B 27/10    (2006.01)

(52) U.S. Cl. ............... 359/460; 359/453; 359/457; 359/900; 359/619

(58) Field of Classification Search ............... 359/460, 359/443, 449, 900, 452–453, 455–457, 619, 359/624
See application file for complete search history.

(56) References Cited

U.S. PATENT DOCUMENTS 4,979,801 A * 12/1990 Park ............... 359/453

6,304,379 B1 * 10/2001 Kobayashi ............... 359/457
6,862,139 B2 *  3/2005 Chang et al. ............... 359/453
6,937,393 B2 *  8/2005 Kim et al. ............... 359/457
2004/0061945 A1 *  4/2004 Wolfe ............... 359/619

FOREIGN PATENT DOCUMENTS

| JP | 58-190935 | 11/1983 |
| JP | 58-205140 | 11/1983 |
| JP | 63-163329 | 7/1988 |
| JP | 63-212925 | 9/1988 |
| JP | 63-265235 | 11/1988 |

(Continued)

OTHER PUBLICATIONS

Communication from Japanese Patent Office regarding related application.

Primary Examiner—W. B. Perkey
Assistant Examiner—Magda Cruz
(74) Attorney, Agent, or Firm—Harness, Dickey & Pierce, P.L.C.

(57) ABSTRACT

A screen member for a transmission screen is manufactured by a method including the steps: preparing a microlens substrate, of which the light incident face is formed with a plurality of microlenses; forming a black matrix from a first layer, made by applying a material including a positive photopolymer onto the light emission face of the microlens substrate, on the light emission face of the microlens substrate so that the black matrix has a plurality of openings on light paths of the light that has been transmitted by the microlenses of the microlens substrate; and forming a plurality of light diffusion portions for diffusing the light that has been transmitted by each microlens of the microlens substrate from a second layer, made by applying a material including a negative photopolymer onto the black matrix.

23 Claims, 10 Drawing Sheets

FOREIGN PATENT DOCUMENTS

| | | |
|---|---|---|
| JP | 01-182837 | 7/1989 |
| JP | 02-239202 | 10/1990 |
| JP | 3-92634 | 9/1991 |
| JP | 7-21612 | 3/1995 |
| JP | 07-281180 | 10/1995 |
| JP | 08-114895 | 5/1996 |
| JP | 10-020404 | 1/1998 |
| JP | 10-104752 | 4/1998 |
| JP | 10-123623 | 5/1998 |
| JP | 11-044890 | 2/1999 |
| JP | 11-344602 | 12/1999 |
| JP | 2000-019607 | 1/2000 |
| JP | 2000-122228 | 4/2000 |
| JP | 2000-171906 | 6/2000 |
| JP | 2000-292862 | 10/2000 |
| JP | 2000-321993 | 11/2000 |
| JP | 2001-074918 | 3/2001 |
| JP | 2001-092026 | 4/2001 |
| JP | 2001-201611 | 7/2001 |
| JP | 2001-209131 | 8/2001 |
| JP | 2001-339103 | 12/2001 |
| JP | 2002-048987 | 2/2002 |
| JP | 2002-139406 | 5/2002 |
| JP | 2002-278079 | 10/2002 |
| JP | 2003-080598 | 3/2003 |
| JP | 2003-177476 | 6/2003 |

* cited by examiner

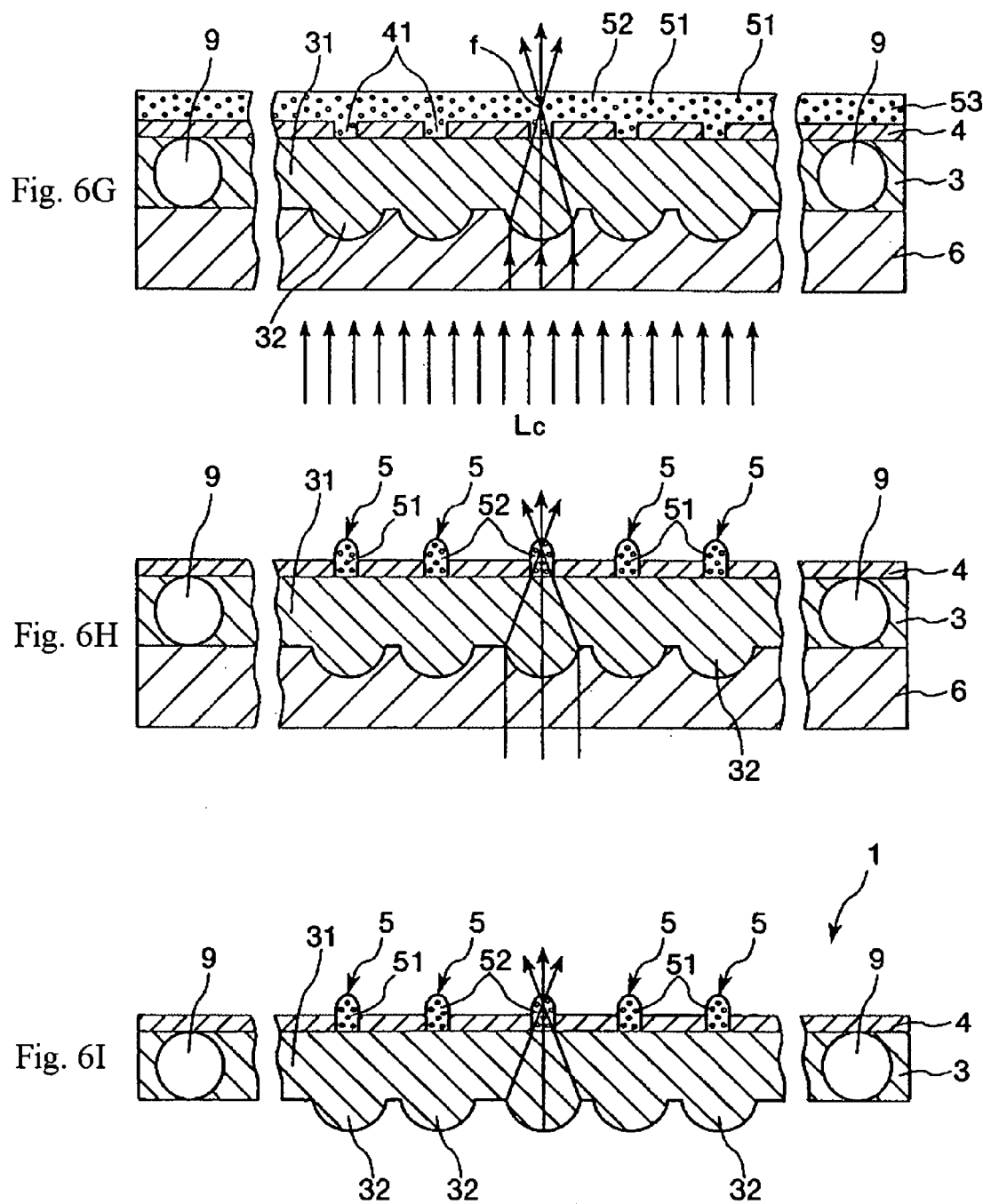

METHOD OF MANUFACTURING A SCREEN MEMBER FOR A TRANSMISSION SCREEN, A SCREEN MEMBER FOR A TRANSMISSION SCREEN, A TRANSMISSION SCREEN AND A REAR PROJECTION

CROSS-REFERENCE TO RELATED APPLICATION

This application claims priority to Japanese Patent Application No. 2003-316016 filed Sep. 8, 2003, which is hereby expressly incorporated by reference herein in its entirety.

FIELD OF THE INVENTION

The present invention relates to a method of manufacturing a screen member for a transmission screen, a screen member for a transmission screen, a transmission screen, and a rear projection.

BACKGROUND OF THE INVENTION

In recent years, demand for a rear projection is becoming increasingly strong as a suitable display for a monitor for a home theater, a large screen television, or the like.

In a transmission screen used for the rear projection, a lenticular lens substrate is in general use. However, this type of screen has a problem that the vertical angle of view thereof is small although the lateral angle of view thereof is large (namely, there is a bias in the angles of view).

As a solution to such a problem, there has been proposed a transmission screen which uses a microlens array sheet (microlens substrate) in place of the lenticular lens substrate and includes a black matrix provided at an emission face side of the microlens array sheet and a light diffusion layer provided on the whole area of the microlens array sheet at the emission face side (see, for example, Japanese Laid-Open Patent Application No. 2003-177476). In this transmission screen, the horizontal angle of view and vertical angle of view thereof are controlled by the microlenses arranged in a matrix, and the incident light is diffused by the light diffusion layer. This makes it possible to enlarge the angles of view of the transmission screen.

However, in such a transmission screen, since the light (photons) entering the light diffusion layer collides with the diffusion media frequently, the light (photons) entering the light diffusion layer is reflected by the light diffusion layer and returns to the back face side (that is, incident face side) thereof easily. Further, this makes the degree of extinction due to the collision with the diffusion media or the like enlarge. Thus, there is a problem that light use efficiency of the transmission screen becomes low. Further, in such a transmission screen, diffusion of the light occurs with high frequency even on the portions where the light diffusion layer is provided on the black matrix (on the light emission face of the black matrix). Hence, there is the case where sufficient contrast cannot be obtained in the displayed image in spite of the presence of the black matrix.

SUMMARY OF THE INVENTION

It is one object of the present invention to provide a transmission screen having excellent angle of view characteristics and light use efficiency.

Further, it is another object of the present invention to provide a method of manufacturing a screen member for a transmission screen constituting the transmission screen mentioned above easily and surely.

Moreover, it is still another object of the present invention to provide a rear projection with the above-mentioned transmission screen.

In order to achieve the above objects, in one aspect of the present invention, the present invention is directed to a method of manufacturing a screen member for a transmission screen. The method includes the steps of:

preparing a lens substrate having a light incident face and a light emission face opposite to the light incident face, the light incident face of the lens substrate being formed with a plurality of lens portions for condensing incident light;

forming a light shielding layer from a first layer on the light emission face of the lens substrate so that the light shielding layer has a plurality of openings on light paths of the light that has been transmitted by the lens portions of the lens substrate; and forming a plurality of light diffusion portions for diffusing the light that has been transmitted by each lens portion of the lens substrate;

wherein the light diffusion portions forming step includes:

forming a second layer on the light shielding layer by applying a material including a negative photopolymer onto the light shielding layer;

exposing the second layer by allowing light to enter the lens substrate from the light incident face thereof so that the light is condensed by the each lens portion and then the second layer is irradiated by the condensed light; and developing the second layer so that portions of the second layer that have exposed by the condensed light remain as they are.

This makes it possible to provide a transmission screen having excellent angle of view characteristics and light use efficiency easily and surely using the screen member for a transmission screen manufactured by the method of the invention.

In the method of manufacturing the screen member for a transmission screen according to the invention, it is preferable that the light shielding layer forming step includes:

forming the first layer on the light emission face of the lens substrate by applying a material including a positive photopolymer onto the light emission face of the lens substrate;

exposing the first layer by allowing light to enter the lens substrate from the light incident face thereof so that the light is condensed by the each lens portion and then the first layer is irradiated by the condensed light; and developing the first layer so that portions of the first layer have been exposed by the condensed light are removed to thereby form the plurality of openings.

This makes it possible to provide a transmission screen having excellent angle of view characteristics and light use efficiency easily and surely using the screen member for a transmission screen manufactured by the method of the invention.

In the method of manufacturing the screen member for a transmission screen according to the invention, it is preferable that each of the lens portions of the lens substrate is designed so that the light entering each lens portion is focused on the side of the light emission face of the lens substrate beyond the light shielding layer.

This makes it possible to further improve the light use efficiency of the transmission screen provided with the screen member for a transmission screen manufactured by the method of the invention.

In the method of manufacturing the screen member for a transmission screen according to the invention, it is preferable that each of the light diffusion portions is formed into a protrusion that protrudes from the surface of the light shielding layer at a position where the corresponding opening of the light shielding layer is located.

This makes it possible to further improve the light use efficiency of the transmission screen provided with the screen member for a transmission screen manufactured by the method of the invention. Further, it is possible to improve the contrast of a projected image by the transmission screen particularly.

In the method of manufacturing the screen member for a transmission screen according to the invention, it is preferable that the ratio of the total area occupied by the protrusions with respect to the total area occupied by the lens portions when viewed from the top of the light incident face of the lens substrate is in the range of 5 to 99%.

This makes it possible to further improve the light use efficiency of the transmission screen provided with the screen member for a transmission screen manufactured by the method of the invention. Further, it is possible to further improve the contrast of the projected image.

In the method of manufacturing the screen member for a transmission screen according to the invention, it is preferable that the plurality of light diffusion portions in the form of the protrusions are independently formed with each other.

This makes it possible to further improve the light use efficiency of the transmission screen provided with the screen member for a transmission screen manufactured by the method of the invention. Further, it is possible to improve the contrast of a projected image by the transmission screen particularly.

In the method of manufacturing the screen member for a transmission screen according to the invention, it is preferable that the ratio of the total area occupied by the light diffusion portions with respect to the total area occupied by the lens portions when viewed from the top of the light incident face of the lens substrate is in the range of 5 to 99%.

This makes it possible to further improve the angle of view characteristics and the light use efficiency of the transmission screen provided with the screen member for a transmission screen manufactured by the method of the invention. Further, it is possible to improve the contrast of a projected image by the transmission screen particularly.

In the method of manufacturing the screen member for a transmission screen according to the invention, it is preferable that the screen member for the transmission screen has a major surface, and the length of each of the light diffusion portions is in the range of 2 to 450 μm in a direction perpendicular to the major surface of the screen member for the transmission screen.

This makes it possible to further improve the light use efficiency of the transmission screen provided with the screen member for a transmission screen manufactured by the method of the invention.

In the method of manufacturing the screen member for a transmission screen according to the invention, it is preferable that the screen member for the transmission screen has a major surface, and a focal point of each of the lens portions is located at a substantially central portion of the corresponding light diffusion portion in a direction perpendicular to the major surface of the screen member for the transmission screen.

This makes it possible to further improve the light use efficiency of the transmission screen provided with the screen member for a transmission screen manufactured by the method of the invention.

In the method of manufacturing the screen member for a transmission screen according to the invention, it is preferable that the lens substrate is manufactured using a substrate provided with concave portions corresponding to the plurality of lens portions of the lens substrate.

This makes it possible to obtain the lens substrate on which the plurality of lens portions each having desired size and shape are arranged easily and surely. As a result, it is possible to improve the productivity of the transmission screen provided with the screen member for a transmission screen manufactured by the method of the invention, and the obtained transmission screen has stable characteristics and high reliability.

In the method of manufacturing the screen member for a transmission screen according to the invention, it is preferable that the light incident face of the lens substrate has a usable area where the plurality of lens portions are formed, in which the ratio of the total area occupied by the lens portions with respect to the usable are of the lens substrate when viewed from the top of the light incident face of the lens substrate is 90% or more.

This makes it possible to further improve the light use efficiency of the transmission screen provided with the screen member for a transmission screen manufactured by the method of the invention.

In the method of manufacturing the screen member for a transmission screen according to the invention, it is preferable that each of the lens portions is formed into a microlens.

This makes it possible to further improve the angle of view characteristics of the transmission screen provided with the screen member for a transmission screen. Namely, it is possible to increase the vertical angle of view of the transmission screen in addition to the horizontal angle of view thereof.

In the method of manufacturing the screen member for a transmission screen according to the invention, it is preferable that the plurality of microlenses are formed so as to be arranged in a random manner when viewed from the top of the light incident face of the lens substrate.

This makes it possible to prevent moire from occurring in the projected image effectively.

In the method of manufacturing the screen member for a transmission screen according to the invention, it is preferable that curvature radii of the plurality of microlenses are substantially the same as each other.

This makes it possible to form the light diffusion portion and the light shielding layer provided with the plurality of openings easily. As a result, it is possible to improve the productivity of the screen member for a transmission screen particularly.

In the method of manufacturing the screen member for a transmission screen according to the invention, it is preferable that the diameter of each of the microlenses is in the range of 10 to 500 μm.

This makes it possible to obtain sufficient resolution on the projected image while keeping the high productivity of the screen member for a transmission screen.

In the method of manufacturing the screen member for a transmission screen according to the invention, it is preferable that This makes it possible to obtain sufficient light permeability (light use efficiency) while further improving the contrast of the projected image.

In another aspect of the invention, the present invention is directed to a screen member for a transmission screen. The screen member for a transmission screen of the invention is manufactured using the method of manufacturing the screen member for a transmission screen of the invention defined as mentioned above.

In still another aspect of the invention, the present invention is directed to a transmission screen. The transmission screen includes the screen member for a transmission screen of the invention defined as mentioned above.

This makes it possible to provide a transmission screen having excellent angle of view characteristics and light use efficiency.

It is preferable that the transmission screen of the invention further includes a Fresnel lens portion with a Fresnel lens, the Fresnel lens portion having an emission face and the Fresnel lens being formed in the emission face of the Fresnel lens portion wherein the screen member for a transmission screen is arranged on the side of the emission face of the Fresnel lens portion.

This makes it possible to provide a transmission screen having excellent angle of view characteristics and light use efficiency.

In still another aspect of the invention, the present invention is directed to a rear projection. In one embodiment, the rear projection of the invention includes the screen member for a transmission screen of the invention defined as mentioned above.

This makes it possible to provide a rear projection provided with the screen member for a transmission screen which has excellent angle of view characteristics and light use efficiency.

In another embodiment, the rear projection of the invention includes the transmission screen of the invention defined as mentioned above.

This makes it possible to provide a rear projection provided with the transmission screen which has excellent angle of view characteristics and light use efficiency.

It is preferable that the rear projection of the invention further includes:

a projection optical unit; and a light guiding mirror.

This makes it possible to provide a rear projection having excellent angle of view characteristics and light use efficiency.

BRIEF DESCRIPTION OF THE DRAWINGS

The foregoing and other objects, features and advantages of the invention will become more readily apparent from the following detailed description of preferred embodiments of the invention which proceeds with reference to the accompanying drawings.

DETAILED DESCRIPTION OF THE INVENTION

A detailed description will now be given for a method of manufacturing a screen member for a transmission screen, a screen member for a transmission screen, a transmission screen and a rear projection of the preferred embodiments according to the present invention with reference to the accompanying drawings.

First, the constitutions of the screen member for a transmission screen and the transmission screen of the invention will now be described.

Figure 1:
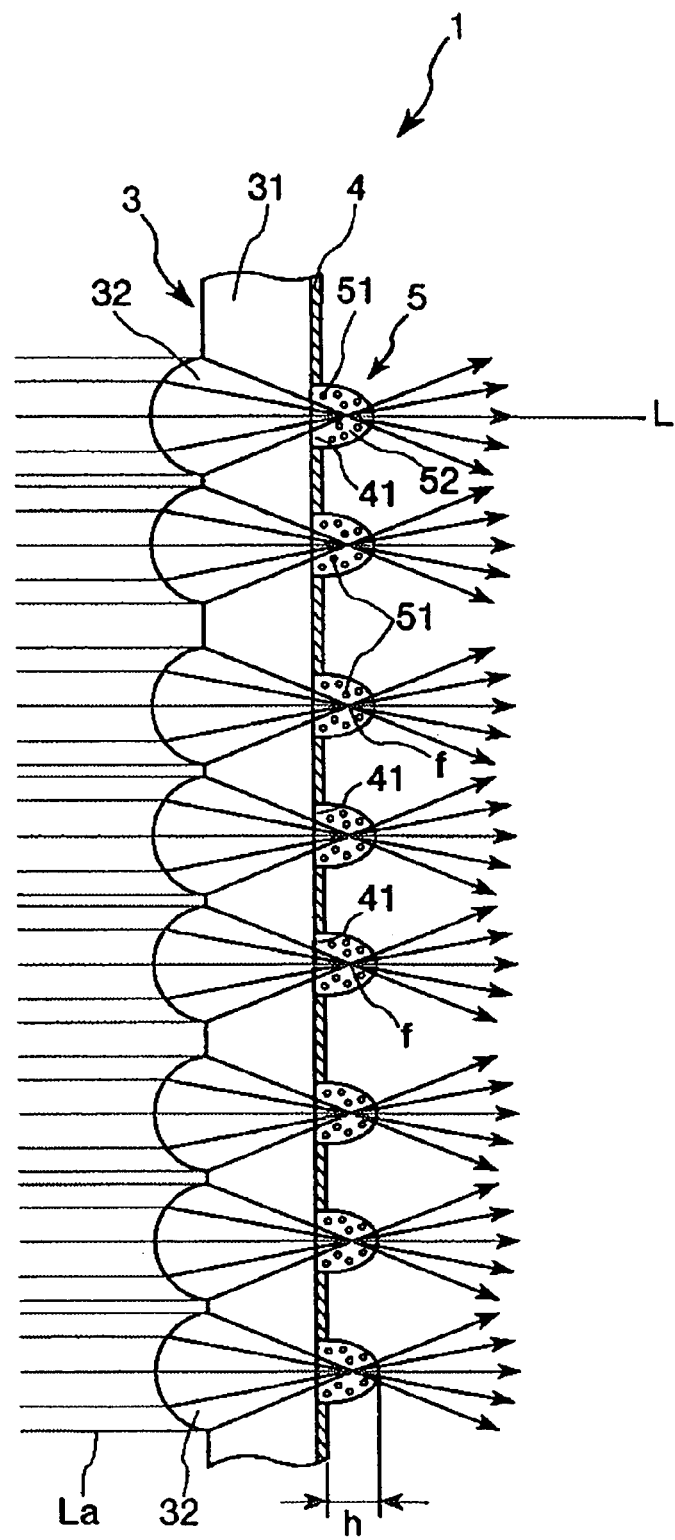
FIG. 1 is a schematic longitudinal cross-sectional view showing a screen member for a transmission screen in a preferred embodiment according to the present invention.
Figure 2:
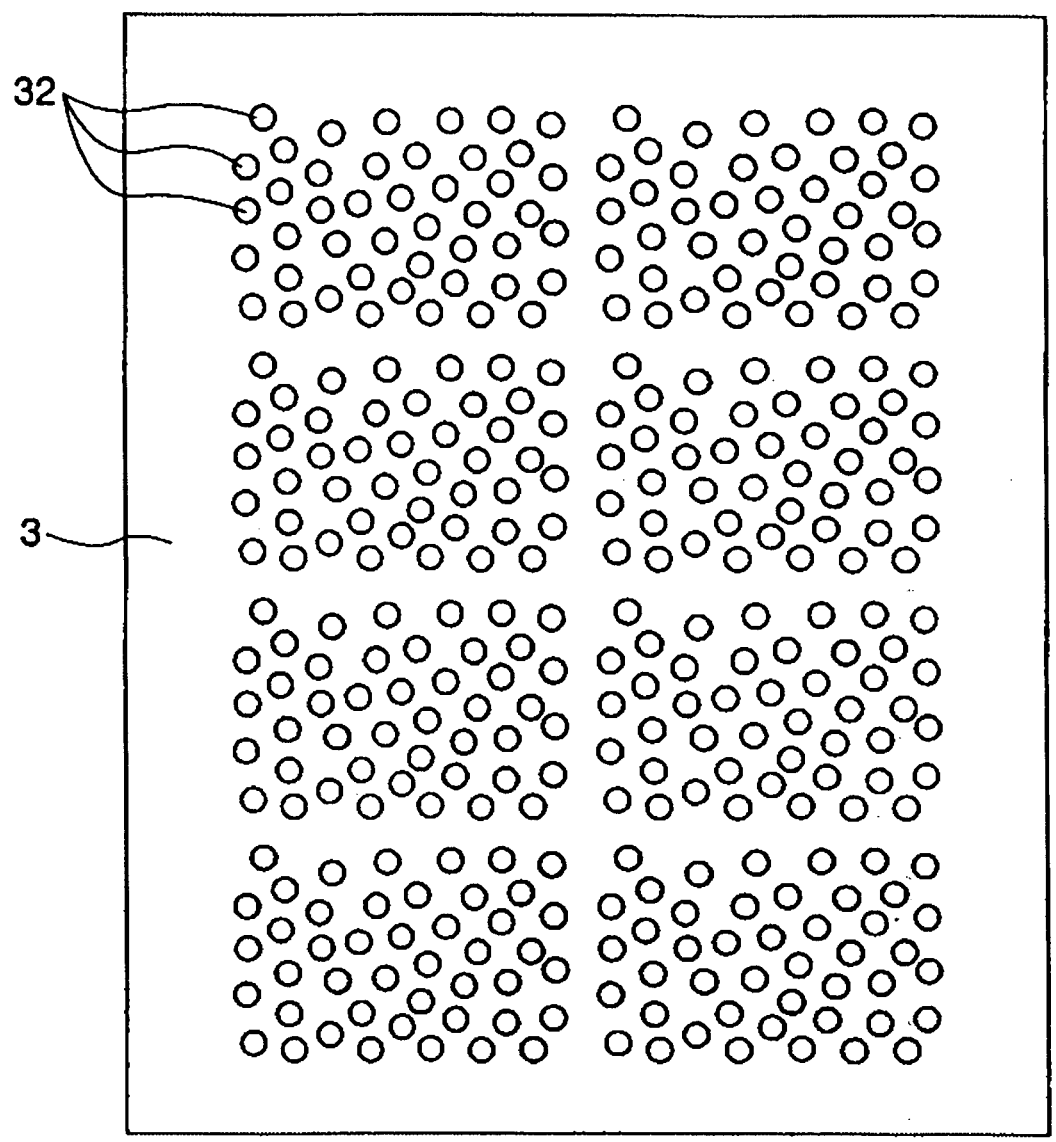
FIG. 2 is a plan view showing a microlens substrate with which the transmission screen shown in FIG. 1 is provided.
Figure 3:
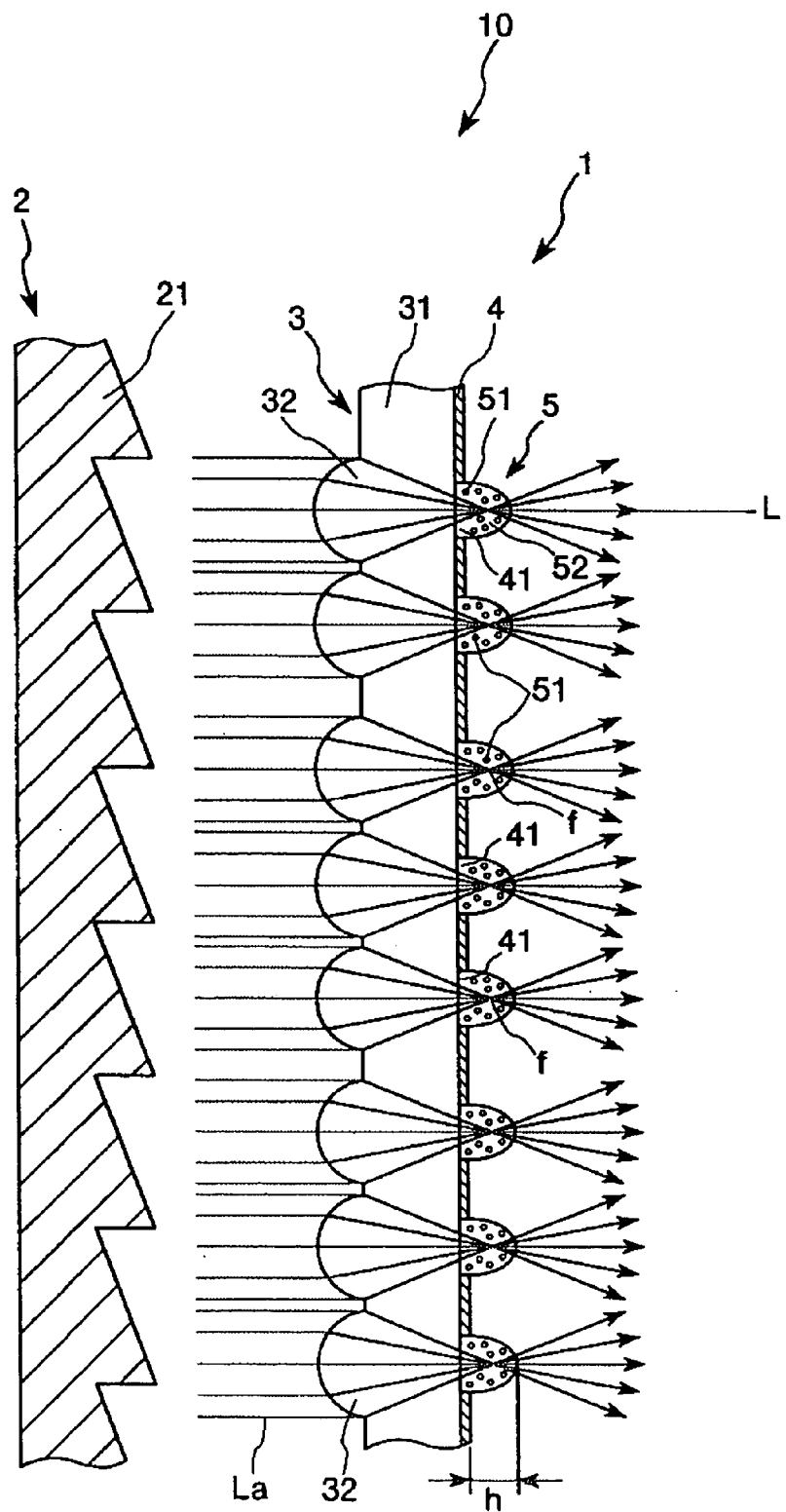
FIG. 3 is a schematic longitudinal cross-sectional view showing a transmission screen provided with the screen member for the transmission screen shown in FIG. 1 in a preferred embodiment according to the present invention.

FIG. 1 is a schematic longitudinal cross-sectional view showing a screen member for a transmission screen in a preferred embodiment according to the present invention. FIG. 2 is a plan view showing a microlens substrate with which the transmission screen shown in FIG. 1 is provided. FIG. 3 is a schematic longitudinal cross-sectional view showing a transmission screen provided with the screen member for the transmission screen shown in FIG. 1 in a preferred embodiment according to the present invention. In this regard, in the following description, the left sides and right sides in FIGS. 1 and 3 are referred to as a "light incident side (or light incident face)" and a "light emission side (or light emission face)", respectively.

A screen member 1 for a transmission screen is a member constituting a transmission screen 10 described later. As shown in FIG. 1, the screen member 1 for a transmission screen includes: a microlens substrate (lens substrate) 3 having a function of condensing incident light; a black matrix (light shielding layer) 4 made from a material having light shielding (blocking) effect; and a light diffusion portions 5 each having a function of diffusing the incident light by diffuse reflection.

The microlens substrate 3 has a light incident face and a light emission face opposite to the light incident face. Further, the microlens substrate 3 has a resin layer 31, and a large number of microlenses (lens portions) 32 formed on the light incident face of the microlens substrate 3 (that is, the surface of an incident side of the resin layer 31).

The resin layer 31 is mainly constituted from resin material that is transparent with a predetermined index of refraction.

Each of the microlenses 32 is formed as a convex lens of which the convex portion protrudes to the light incident face of the microlens substrate 3. Further, each microlens 32 is designed so that the light transmitting the microlens 32 is focused on the side of the light emission face of the microlens substrate 3 beyond the black matrix (light shielding layer) 4 (namely, the microlens substrate 3 is designed so that a focal point f of each microlens 32 is located at the side of the light emission face of the microlens substrate 3 beyond the black matrix (light shielding layer) 4). In other words, parallel light La entering the microlens substrate 3 from a direction perpendicular to a major surface of the microlens substrate 3 (parallel light La incident from a Fresnel lens portion 2 described later) is condensed by each of the microlenses 32 of the microlens substrate 3, and focused on the side of the light emission face of the microlens substrate 3 beyond the black matrix (light shielding layer) 4 (that is, a focal point f in FIG. 1). Since each of the microlenses 32 focuses the light on the side of the light emission face of the microlens substrate 3 beyond the black matrix (light shielding layer) 4 in this manner, it is possible to make light use efficiency excellent particularly. To explain it in more detail, by condensing the light emitting from the microlens 32 at the light diffusion portions 5 described later, the screen member 1 for a transmission screen acts as if a light source is located at each of the light diffusion portions 5 on the light emission face of the microlens substrate 3 beyond the black matrix 4. This makes it possible to diffuse the light entering the light diffusion portions 5 to the side of the light emission face of the microlens substrate 3 efficiently while effectively preventing the light (photons) condensed by the microlenses 32 from returning to the side of the light incident face of the microlens substrate 3 again. As a result, it is possible to make the light use efficiency of the screen member 1 for a transmission screen particular excellent, whereby it is possible to make a transmission screen 10 provided with the screen member 1 for a transmission screen-excellent.

It is preferable that the focal point f of each of the microlenses 32 is away from the black matrix 4 (that is, the surface at the light emission side of the black matrix 4) by the range of 1 to 250 μm, and more preferably it is away from the black matrix 4 by the range of 2 to 50 μm. In the case where the focal point f of each microlens 32 is located on the side of the light incident face of the microlens substrate 3 from the above range, depending on a type of diffusion media 51 contained in the light diffusion portion 5, the amount of light returning from the light diffusion portion 5 becomes great, whereby there is a possibility that enough light use efficiency cannot be obtained. On the other hand, in the case where the focal point f of each microlens 32 is located on the side of the light emission face of the microlens substrate 3 from the above range, depending on a height of the light diffusion portion 5 described later or the like, diffusion of the light by the light diffusion portion 5 becomes insufficient, whereby there is a possibility that the effect to improve the angle of view characteristics cannot be obtained sufficiently.

It is preferable that the diameter of each of the microlenses 32 is in the range of 10 to 500 μm, and more preferably it is in the range of 30 to 300 μm, and further more preferably it is in the range of 50 to 100 μm. By restricting the diameter of each of the microlenses 32 in the above ranges, it is possible to further enhance the productivity of the screen member 1 for a transmission screen (transmission screen 10) while maintaining sufficient resolution in the image projected on the screen. In this regard, it is preferable that the pitch between adjacent microlenses 32 in the microlens substrate 3 is in the range of 10 to 500 μm, more preferably the pitch is in the range of 30 to 300 μm, and further more preferably the pitch is in the range of 50 to 100 μm.

Further, it is preferable that curvature radii of the plurality of microlenses 32 constituting the screen member 1 for a transmission screen are substantially the same as each other, and more preferably curvature radii of almost all the microlenses 32 constituting the screen member 1 for a transmission screen are substantially the same as each other. This makes it possible to form the black matrix 4 and the light diffusion portions 5 more easily and surely using a method described later (that is, a method of manufacturing a screen member for a transmission screen).

Moreover, an arrangement pattern of the microlenses 32 is not particularly limited. The arrangement pattern may be either an arrangement pattern in which the microlenses 32 are arranged in a regular manner or an arrangement pattern in which the microlenses 32 are arranged in an optically random manner (the microlenses 32 are randomly arranged when viewed from the top of the light incident face of the microlens substrate 3 (when viewed from a major surface of the screen member 1 for a transmission screen)). However, it is preferable that the microlenses 32 are randomly arranged as shown in FIG. 2. By arranging the microlenses 32 in a random manner, it is possible to effectively prevent interference of a light valve of a liquid crystal or the like and a Fresnel lens, and therefore it is possible to prevent occurrence of moire almost completely. This makes it possible to obtain an excellent transmission screen 10 having a high display quality.

Further, it is preferable that the ratio of an area (projected area) occupied by all the microlenses 32 in a usable area where the microlenses 32 are formed with respect to the entire usable area is 90% or more when viewed from the top of the light incident face of the microlens substrate 3 (that is, a direction shown in FIG. 2). More preferably the ratio is 96% or more. In the case where the ratio of the area occupied by all the microlenses 32 in the usable area with respect to the entire usable area is 90% or more, it is possible to reduce straight light passing through an area other than the area where the microlenses 32 reside, and this makes it possible to enhance the light use efficiency of the screen member 1 further.

As described above, the black matrix 4 and the light diffusion portions 5 are formed on the light emission face of the microlens substrate 3.

The black matrix 4 is made of a material having light shielding (blocking) effect, and formed in a layer manner. By applying such a black matrix 4 to the microlens substrate 3, it is possible to absorb outer light (that is, outer light undesirable in forming a projected image), and this makes it possible to make the image projected to a screen have excellent contrast.

The black matrix 4 has a plurality of openings 41 on light paths of the light that has been transmitted by the microlenses 32 of the microlens substrate 3. This makes it possible to allow the light condensed by the microlenses 32 to enter the light diffusion portions 5 through the openings 41 of the black matrix 4.

The size of each opening 41 is not particularly limited. However, it is preferable that the diameter of the opening 41 is in the range of 9 to 500 μm, and more preferably it is in the range of 9 to 450 μm, and further more preferably it is in the range of 20 to 90 μm. By restricting the diameter of each of the openings 41 in the above ranges, it is possible to make the light that has been transmitted by the microlenses 32 enter the light diffusion portions 5 described later efficiently, and this makes it possible to make the image projected to a screen have excellent contrast.

The light diffusion portion 5 has a function of diffusing incident light by diffuse reflection. By being provided with such a light diffusion portion 5, it is possible to improve angle of view characteristics. Further, each of the light diffusion portions 5 has a region formed on the light emission face of the microlens substrate 3 beyond the black matrix 4. Since the light diffusion portion 5 has such a constitution, it is possible to direct the incident light into the light diffusion portion 5 to the side of the light emission face of the microlens substrate 3 (that is, a direction opposite to the side of the light incident face) effectively. This makes it possible to improve the angle of view characteristics of the transmission screen 10 provided with the screen member 1 for a transmission screen particularly (that is, it is possible to enlarge the angle of view capable of viewing the image projected to a screen appropriately). In this embodiment, the light diffusion portion 5 is constituted so that diffusion media 51 is dispersed into a substantially transparent material having an excellent light permeability (for example, acrylic resin, polycarbonate resin, or the like). Silica, grass, resin or the like in the form of particulates (beads) can be used as the diffusion media 51, for example. Although an average grain diameter of the diffusion media 51 is not particularly limited, it is preferable that the average grain diameter of the diffusion media 51 is in the range of 1.0 to 50 µm, and more preferably it is in the range of 2.0 to 10 µm. Moreover, heat treatment such as a prebake process, for example, may be carried out after applying the photopolymer 52 if needed.

Further, the light diffusion portions 5 are provided on at least portions corresponding to the openings 41 of the black matrix 4, and each of the light diffusion portions 5 is formed into a protrusion that protrudes from the surface of the black matrix 4. If the light diffusion portion 4 has the protrusion in this manner, it is possible to improve the light use efficiency of the transmission screen 10 provided with the screen member 1 for a transmission screen. To explain it in more detail, in the case where a light diffusion portion (light diffusion layer) is formed in the form of layer with a uniform thickness on the side of the light emission face of a microlens substrate on a black matrix, probability (frequency) that light (photons) collides with diffusion media is increased, and probability that the light (photons) entering the inside of the light diffusion portion returns to the side of the light incident face of the microlens substrate again. This makes extinction tend to occur and light use efficiency thereof become lower. On the other hand, in the case where the light diffusion portion 5 has the protrusion at the portion corresponding to the opening 41, it is possible to diffuse the light entering the light diffusion portion 5 to the side of the light emission face of the microlens substrate 3 efficiently while effectively preventing the extinction from becoming marked due to excessive collision of the light (photons) entering the inside of the light diffusion portion 5 and the diffusion media 51, and the light (photons) condensed by the microlenses 32 from returning to the side of the light incident face of the microlens substrate 3 again. As a result, it is possible to improve the angle of view characteristics of the transmission screen 10 (that is, the screen member 1 for a transmission screen). Further, in the case where the light diffusion portion 5 has such a protrusion, the screen member 1 for a transmission screen can be constructed so as to have a region where the height of the light diffusion portion 5 is a relative low or a region where the light diffusion portion 5 is not formed between adjacent protrusions (in the structure shown in FIG. 1, the screen member 1 for a transmission screen has a region where the light diffusion portion 5 is not formed between the adjacent protrusions). This makes it possible to fulfill the function of the black matrix (light shielding layer) 4 more effectively, and therefore, it is possible to improve the contrast of an image projected to a screen particularly. In this regard, even in the case where the screen member 1 for a transmission screen has light diffusion portions each having a uniform thickness on the black matrix 4 at the light emission face of the microlens substrate 3, it seems that occurrence of the problems described above can be prevented by lowering (reducing) the height (thickness) of the light diffusion portion (for example, 1 µm or less). However, in this case, it is difficult to diffuse the light entering the inside of the light diffusion portion sufficiently.

It is preferable that the ratio of the total area (projected area) occupied by the protrusions with respect to the total area occupied by the microlenses 32 when viewed from the top of the light incident face of the microlens substrate 3 (that is, the top of the screen member 1 for a transmission screen) is in the range of 5 to 99%. More preferably the ratio is in the range of 5 to 95%. Further more preferably the ratio is in the range of 30 to 70%. By restricting the ratio of the total area occupied by the protrusions in the above ranges, it is possible to further improve the light use efficiency of the transmission screen 10 provided with the screen member 1 for a transmission screen. Further, it is possible to further improve the contrast of the projected image. If the ratio of the total area occupied by the protrusions is below the lower limit given above, it is difficult to diffuse the light entering the light diffusion portions 5 efficiently, whereby there is a probability that it is difficult to obtain enough angle of view characteristics of the transmission screen 10 provided with the screen member 1 for a transmission screen. On the other hand, if the ratio of the total area occupied by the protrusions is over the upper limit given above, extinction tends to occur inside the light diffusion portions 5 (protrusions), whereby the light use efficiency thereof goes down (is reduced). In addition, in this case, since the ratio of the area covered with the light diffusion portions 5 (protrusions) with respect to the surface of the black matrix 4 (the region of the black matrix 4 except for the openings 41) when viewed from the top of the light emission face of the screen member 1 for a transmission screen becomes large, the contrast of the image projected to a screen tends to become lower. Therefore, it is preferable that the area of the openings 41 is substantially the same as the projected area of the protrusions that are formed so that the protrusions respectively correspond to the openings 41 (that is, the area of portions that cover the black matrix 4 is small). More specifically, in the case where the ratios of the total area respectively occupied by the openings 41 and the protrusions with respect to the total area occupied by the microlenses 32 when viewed from the top of the light incident face of the screen member 1 for a transmission screen (that is, when viewed from the direction shown in FIG. 2) are A% and B%, it is preferable to meet the relationship of $0.2 \leq A/B \leq 1.55$. More preferably it is to meet the relationship of $0.5 \leq A/B \leq 1.2$. This makes the effect described above become marked. Further, according to the method described later (method of manufacturing a screen member for a transmission screen of the invention), it is possible to obtain the screen member 1 for a transmission screen that meets the above condition with relative ease.

In the structure shown in FIG. 1, the screen member 1 for a transmission screen is provided with a plurality of light diffusion portions 5. Namely, the plurality of light diffusion portions 5 in the form of the protrusions are independently and selectively formed with each other so that each of the light diffusion portions 5 corresponds to each of the openings 41 of the black matrix 4. In the case where the plurality of light diffusion portions 5 are independently provided with each other in this manner, it is possible to improve the light use efficiency of the screen member 1 for a transmission screen and to improve the contrast of the image projected to a screen. More specifically, in the case where the plurality of light diffusion portions 5 are independently provided with each other, it is possible to diffuse the light entering the light diffusion portion 5 to the side of the light emission face of the screen member 1 for a transmission screen while more effectively preventing the extinction from becoming marked due to excessive collision of the light (photons) entering the inside of the light diffusion portions 5 and the diffusion media 51, and the light (photons) condensed by the microlenses 32 from returning to the side of the light incident face of the microlens substrate 3 again. As a result, it is possible to improve the light use efficiency of the transmission screen 10 particularly, and to improve the angle of view characteristics of the transmission screen 10 (that is, the screen member 1 for a transmission screen). Further, in the case where the plurality of light diffusion portions 5 are independently provided with each other, the screen member 1 for a transmission screen has no region where the black matrix 4 is not covered with the light diffusion portions 5 between adjacent light diffusion portions 5. This makes it possible to fulfill the function of the black matrix (light shielding layer) 4 more effectively, and therefore, it is possible to improve the contrast of the image projected to a screen particularly.

It is preferable that the ratio of the total area (projected area) occupied by the light diffusion portions 5 with respect to the total area occupied by the microlenses 32 when viewed from the top of the light incident face of the microlens substrate 3 (that is, the top of the screen member 1 for a transmission screen) is in the range of 5 to 99%. More preferably the ratio is in the range of 5 to 95%. Further more preferably the ratio is in the range of 30 to 70%. By restricting the ratio of the total area (projected area) occupied by the light diffusion portions 5 in the above ranges, it is possible to further improve the angle of view characteristics and the light use efficiency of the transmission screen 10 provided with the screen member 1 for a transmission screen, and to improve the contrast of the image projected to a screen particularly. Further, it is possible to further improve the contrast of the projected image. If the ratio of the total area occupied by the light diffusion portions 5 is below the lower limit given above, it is difficult to diffuse the light entering the light diffusion portions 5 efficiently, whereby there is a probability that it is difficult to obtain enough angle of view characteristics of the transmission screen 10 provided with the screen member 1 for a transmission screen. On the other hand, if the ratio of the total area occupied by the light diffusion portions 5 is over the upper limit given above, extinction tends to occur inside the light diffusion portions 5, whereby the light use efficiency thereof goes down (is reduced). In addition, in this case, since the ratio of the area covered with the light diffusion portions 5 with respect to the surface of the black matrix 4 when viewed from the top of the light emission face of the screen member 1 for a transmission screen becomes large, the contrast of the image projected to a screen tends to become lower. Therefore, it is preferable that the area of the openings 41 is substantially the same as the projected area of the light diffusion portions 5 that are formed so that the protrusions respectively correspond to the openings 41 (that is, the area of portions that cover the black matrix 4 is small). More specifically, in the case where the ratios of the total area respectively occupied by the openings 41 and the light diffusion portions 5 with respect to the total area occupied by the microlenses 32 when viewed from the top of the light incident face of the screen member 1 for a transmission screen (that is, when viewed from the direction shown in FIG. 2) are A% and C%, it is preferable to meet the relationship of $0.2 \leq A/C \leq 1.5$. More preferably it is to meet the relationship of $0.5 \leq A/C \leq 1.2$. This makes the effect described above become marked. Further, according to the method described later (method of manufacturing a screen member for a transmission screen of the invention), it is possible to obtain the screen member 1 for a transmission screen that meets the above condition with relative ease.

As described above, in the present embodiment, the screen member 1 for a transmission screen is designed so that the focal point f of each of the microlenses 32 is located on the side of the light emission face of the screen member 1 for a transmission screen above the black matrix 4. In addition, it is preferable that the focal point f of each of the microlenses 32 is located at a substantially central portion of the corresponding light diffusion portion 5 in a direction perpendicular to the major surface of the screen member 1 for a transmission screen. Thus, it is possible for the light entering the inside of the light diffusion portions 5 to collide with the diffusion media 51 with appropriate frequency. Hence, it is possible to diffuse the light (photons) entering the inside of the light diffusion portions 5 efficiently while effectively preventing the extinction of the light. Therefore, it is possible to further improve the light use efficiency of the screen member 1 for a transmission screen (that is, transmission screen 10). Moreover, since the light reflected by the light diffusion portion 5 diffuses to the periphery of the light diffusion portions 5, it is possible to obtain wider angle of view of the transmission screen 10 (the screen member 1 for a transmission screen).

It is preferable that the top (apex) of each of the light diffusion portions 5 (protrusions) corresponds to the optical axis L of each of the microlenses 32 (in other words, the apex of each of the protrusions is located on the optical axis L of the corresponding microlens 32). Thus, since the light condensed by the microlens 32 diffuses with the corresponding light diffusion portion 5 substantially isotropically, it is possible to obtain good angle of view characteristics of the transmission screen 10 provided with the screen member 1 for a transmission screen.

Further, it is preferable that the height h of the light diffusion portion 5 (that is, the length of the light diffusion portion 5 in a direction perpendicular to the major surface of the screen member 1 for a transmission screen) is in the range of 2 to 450 μm, and more preferably it is in the range of 2 to 250 μm. Further more preferably it is in the range of 5 to 50 μm. This makes it possible to surely prevent the extinction due to the return of the light reflected by the light diffusion portions 5 to the light incident face of the microlens substrate 3, and therefore, it is possible to obtain high light use efficiency of the transmission screen 10 (screen member 1 for a transmission screen).

Next, a transmission screen 10 provided with the screen member 1 for a transmission screen described above will be described.

As shown in FIG. 3, the transmission screen 10 is provided with a Fresnel lens portion 2 and the screen member 1 for a transmission screen described above. The Fresnel lens portion 2 is arranged on the side of the light incident face of the screen member 1 for a transmission screen (that is, on the incident side of light for an image), and the light that has been transmitted by the Fresnel lens portion 2 enters the screen member 1 for a transmission screen.

The Fresnel lens portion 2 is provided with a Fresnel lens 21 in which a plurality of prisms are formed on a light emission face of the Fresnel lens portion 2 in a substantially concentric manner. The Fresnel lens portion 2 deflects the light for a projected image from a projection lens (not shown in the drawings), and outputs parallel light La that is parallel to the perpendicular direction of the major surface of the screen member 1 for a transmission screen to the side of the light incident face of the screen member 1 for a transmission screen.

In the transmission screen 10 constructed as described above, the light from the projection lens is deflected by the Fresnel lens portion 2 to become the parallel light La. Then, the parallel light La is condensed by each of the microlenses 32 of the microlens substrate 3, and the condensed light passes through each of the openings 41 of the black matrix 4 to enter the light diffusion portions 5. The light entering each of the light diffusion portions 5 is focused on the focal point f at the substantially central portion of the corresponding light diffusion portion 5 and diffused, whereby an observer (viewer) of the transmission screen 10 observes (watches) the light as a flat image.

Next, an example of a method of manufacturing the screen member 1 for the transmission screen described above will be described.

Figure 4:
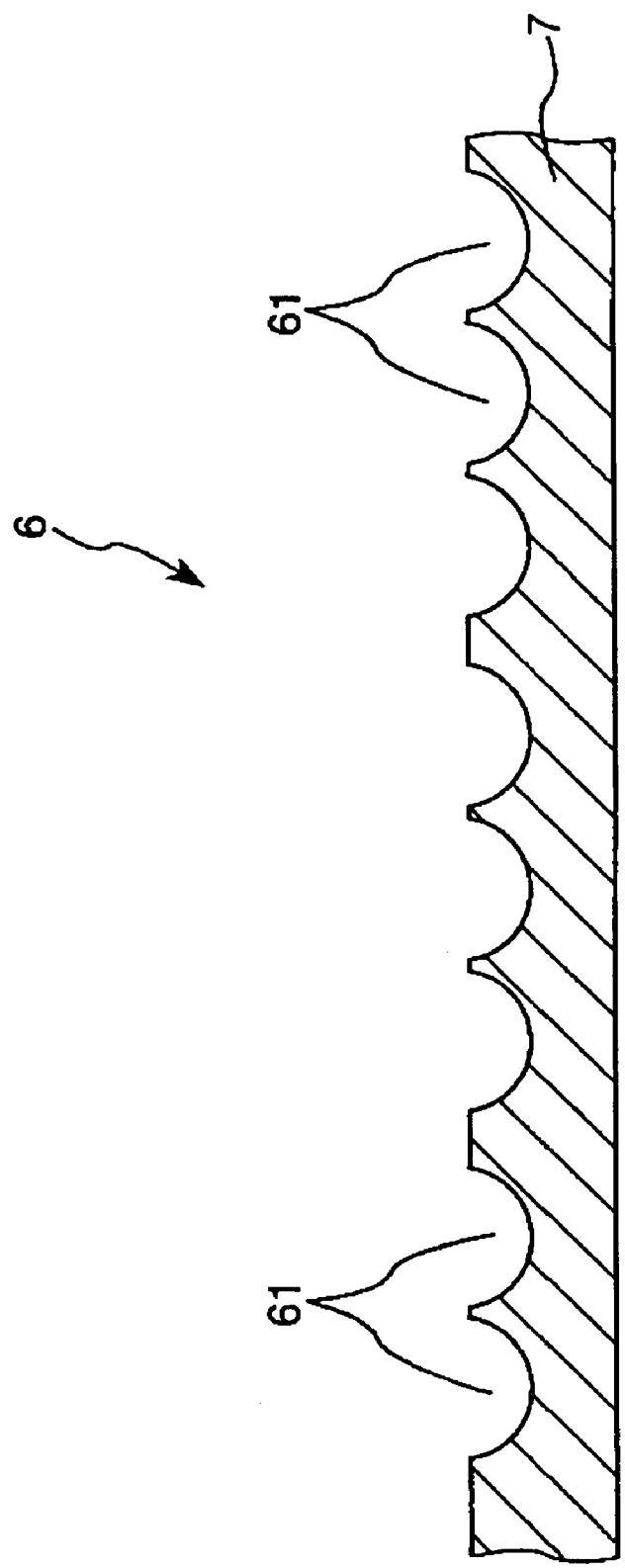
FIG. 4 is a schematic longitudinal cross-sectional view showing a substrate with concave portions for microlenses with the use of manufacturing the microlens substrate.

FIG. 4 is a schematic longitudinal cross-sectional view showing a substrate with concave portions for microlenses with the use of manufacturing the microlens substrate. FIG. 5 is a schematic longitudinal cross-sectional view showing a method of manufacturing the substrate with concave portions for microlenses shown in FIG. 4. FIG. 6 is a schematic longitudinal cross-sectional view showing an example of a method of manufacturing the screen member for a transmission screen shown in FIG. 1. In this regard, in the following description, the lower sides and upper sides in FIG. 6 are referred to as a "light incident side (or light incident face)" and a "light emission side (or light emission face)", respectively.

A structure of the substrate with concave portions for microlenses that can be used to manufacture the microlens substrate and a method of manufacturing the same will be first described prior to the description of a method of manufacturing the screen member for a transmission screen of the invention.

As shown in FIG. 4, a substrate 6 with concave-portions for microlenses has a plurality of concave portions (for microlenses) 61 randomly arranged on a substrate 5.

By using such a substrate 6 with concave portions for microlenses, it is possible to obtain a microlens substrate 3 on which a plurality of microlenses 32 are arranged in an optically random order as described above.

A term "in an optically random order" in the specification means that a plurality of microlenses 32 are arranged irregularly or at random so that it is possible to prevent and suppress occurrence of optical interference such as moire sufficiently.

Next, the method of manufacturing the substrate with concave portions for microlenses will be described with reference to FIG. 5. In this regard, although a large number of concave portions for microlenses are actually formed on the substrate, only a part of them will be exaggeratedly shown in order to simplify the explanation thereof.

First, the substrate 7 is prepared in manufacturing the substrate 6 with concave portions for microlenses.

It is preferable that a substrate having a uniform thickness without flexure and blemishes is used for the substrate 7. Further, it is also preferable that a substrate with a surface cleaned by washing or the like is used for the substrate 7.

Although soda-lime glass, crystalline glass, quartz glass, lead glass, potassium glass, borosilicate glass, alkali-free glass or the like may be mentioned as the material for the substrate 7, soda-lime glass and crystalline glass (for example, neoceram or the like) are preferable among them. By the use of soda-lime glass, crystalline glass or alkali-free glass, it is easy to process the material for the substrate 5, and it is advantageous from the viewpoint of manufacturing cost because soda-lime glass or crystalline glass is relatively inexpensive.

Figure 5A:
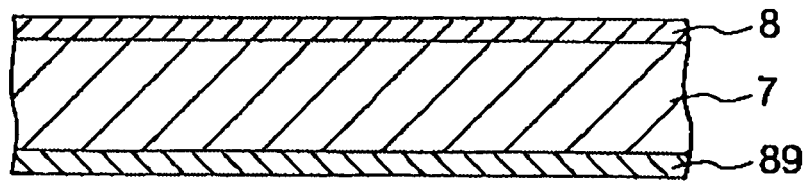
FIG. 5 is a schematic longitudinal cross-sectional view showing a method of manufacturing the substrate with concave portions for microlenses shown in FIG. 4.

<A1> As shown in FIG. 5A, a mask 8 is formed on the surface of the prepared substrate 7 (mask formation process). Then, a rear face protective film 89 is formed on the rear face of the substrate 7 (that is, the face side opposite to the face on which the mask 8 is formed). Needless to say, the mask 8 and the rear face protective film 89 may be formed simultaneously.

It is preferable that the mask 8 permits initial holes 81 described later to be formed therein by means of irradiation with laser beams or the like, and has resistance to an etching process (described later). In other words, it is preferable that the mask 8 is constituted such that it has an etching rate nearly equal to or smaller than that of the substrate 7.

From such a viewpoint, for example, metals such as Cr, Au, Ni, Ti, Pt, and the like, alloys containing two or more kinds selected from these metals, oxides of these metals (metal oxides), silicon, resins, or the like may be mentioned as the material for the mask 8. Alternatively, the mask 8 may be given a laminated structure by a plurality of layers formed of different materials such as a Cr/Au or chromium oxide/Cr laminate.

The method of forming the mask 8 is not particularly limited. In the case where the mask 8 is constituted from metal materials (including alloy) such as Cr and Au or metal oxides such as chromium oxide, the mask 8 can be suitably formed by evaporation method, sputtering method, or the like, for example. On the other hand, in the case where the mask 8 is formed of silicon, the mask 8 can be suitably formed by sputtering method, CVD method, or the like, for example.

In the case where the mask 8 is formed of chromium oxide or chromium as a main component thereof, the initial holes 81 can be easily formed by an initial hole formation process (described later), and the substrate 7 can be protected in the etching process more surely. Further, when the mask 8 has been formed of chromium oxide or chromium as a main component thereof, in the initial hole formation process (described later), a solution of ammonium hydrogen difluoride ($NH_4HF_2$), for example, may be used as an etchant. Since a solution containing ammonium hydrogen difluoride is not poison, it is possible to prevent its influence on the human body during work and on the environment more surely.

Although the thickness of the mask 8 also varies depending upon the material constituting the mask 8, it is preferable to be in the range of 0.01 to 2.0 μm, and more preferably it is in the range of 0.03 to 0.2 μm. If the thickness is below the lower limit given above, there is a possibility to deform shapes of the initial holes 81 formed in the initial hole formation process described later. In addition, there is a possibility that sufficient protection for the masked portion of the substrate 7 cannot be obtained during a wet etching process in the etching step (described later). On the other hand, if the thickness is over the upper limit given above, in addition to the difficulty in formation of the initial holes 81 that penetrate in the initial hole formation process (described later), there will be a case in which the mask 8 tends to be easily removed due to internal stress of the mask 8 depending upon the constituent material or the like of the mask 8.

The rear face protective film 89 is provided for protecting the rear face of the substrate 7 in the subsequent processes. Erosion, deterioration or the like of the rear face of the substrate 7 is suitably prevented by means of the rear face protective film 89. Since the rear face protective film 89 is formed using the same material as the mask 8, it may be provided in a manner similar to the formation of the mask 8 simultaneous with the formation of the mask 8.

Figure 5B:
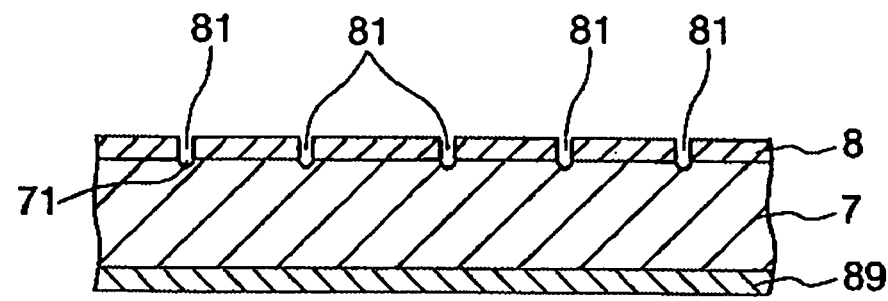

<A2> Next, as shown in FIG. 5B, the plurality of initial holes 81 that will be utilized as mask openings in the etching (described later) are formed in the mask 8 at random by means of the physical method or the irradiation with laser beams (initial hole formation process).

The initial holes 81 may be formed in any method, but it is preferable that the initial holes 61 are formed by the physical method or the irradiation with laser beams. This makes it possible to manufacture the substrate with concave portions for microlenses at high productivity. In particular, the concave portions can be easily formed on a relatively large-sized substrate with concave portions for microlenses.

The physical methods of forming the initial holes 81 includes such methods as, for example, blast processing such as shot blast, sand blast or the like, etching, pressing, dot printing, tapping, rubbing, or the like. In the case where the initial holes 81 are formed by means of the blast processing, it is possible to form the initial holes 81 with high efficiency in a shorter time even for a substrate 7 with a relatively large area (that is, area of the region for formation of microlenses 32).

Further, in the case where the initial holes 81 are formed by means of irradiation with laser beams, the kind of laser beams to be used is not particularly limited, but a ruby laser, a semiconductor laser, a YAG laser, a femtosecond laser, a glass laser, a $YVO_4$ laser, a Ne—He laser, an Ar laser, a carbon dioxide laser, an excimer laser or the like may be mentioned. Further, a waveform of a laser such as SHG (second-harmonic generation), THG (third-harmonic generation), FHG (fourth-harmonic generation) or the like may be utilized. In the case where the initial holes 81 are formed by means of the irradiation of laser beams, it is possible to easily and precisely control the size of the initial holes 81, distance between adjacent initial holes 81, or the like. Moreover, in the case where the initial holes 81 are formed by irradiation with laser beams, by controlling irradiation conditions, it is possible not only to form the initial holes 81 without forming initial concave portions 71 described later, but also to form the initial concave portions 71 having a little variation in shapes, size or depths as well as those of initial holes 81 easily and surely.

It is preferable that the initial holes 81 are formed uniformly on the entire surface of the mask 8. Further, it is preferable that the initial holes 81 are formed in such a manner in which small holes are arranged with a predetermined interval so that there is no flat portion on the surface of the substrate 7, and that the surface is covered with concave portions 61 with almost no space when a wet etching process is carried out in step <A3> (described later).

More specifically, for example, it is preferable that the shape of the formed initial holes 81 when viewed from a top of the substrate 5 is nearly circular and each of the initial holes 81 has an average diameter of the range of 2 to 10 µm. Further, it is preferable that the initial holes 81 are formed on the mask 6 at the rate of one thousand to one million holes per square centimeter ($cm^2$), and more preferably ten thousand to 500 thousand holes per square centimeter ($cm^2$). Furthermore, needless to say, the shape of the initial hole 81 is not limited to a nearly circular shape.

When the initial holes 81 are formed in the mask 8, as shown in FIG. 5B, initial concave portions 71 may also be formed by removing parts of the surface of the substrate 7 in addition to the initial holes 81. This makes it possible to increase contact area with the etchant when the etching process (described later) is carried out, whereby erosion can be started suitably. Further, by adjusting the depth of the initial concave portions 71 it is also possible to adjust the depth of the concave portions 61 (that is, maximum thickness of the lens); Although the depth of the initial concave portion 71 is not particularly limited, it is preferable that it is 5.0 µm or less, and more preferably it is in the range of 0.1 to 0.5 µm. In the case where the formation of the initial holes 81 is carried out by irradiation with laser beams, it is possible to surely reduce variation in the depths of the plurality of initial concave portions 71 formed together with the initial holes 81. This makes it possible to reduce variation in the depths of the concave portions 61 constituting a substrate 6 with concave portions for microlenses, and therefore it is possible to reduce variation in the sizes and shapes of the microlenses 32 in the microlens substrate 3 obtained finally. As a result, it is possible to reduce variation in the diameter, the focal distance, and thickness of the lens of each of the microlenses 32, in particular. It is also possible to form openings 41 of a black matrix 4 and light diffusion portions 5 in the following steps suitably.

Further, the initial holes 81 may be formed in the formed mask 8 not only by means of the physical method or the irradiation with laser beams, but also by, for example, previously arranging foreign objects on the substrate 7 with a predetermined pattern when the mask 8 is formed on the substrate 7, and then forming the mask 8 on the substrate 5 with the foreign objects to form defects in the mask 8 by design so that the defects are utilized as the initial holes 81.

In this way, in the present invention, by the formation of the initial holes 81 in the mask 8 by means of the physical method or the irradiation with laser beams, it is possible to randomly form openings (initial holes 81) in the mask 8 easily and inexpensively compared with the formation of the openings in the mask 8 by means of the conventional photolithography method. Further, the physical method or the irradiation with laser beams makes it possible to deal with a large substrate easily.

Figure 5C:
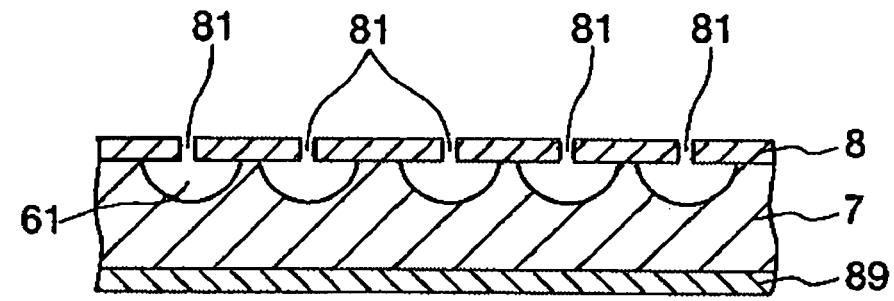

<A3> Next, as shown in FIG. 5C, a large number of concave portions 61 are randomly formed on the substrate 7 by applying the etching process to the substrate 7 using the mask 8 in which the initial holes 81 are formed (etching process).

The etching method is not particularly limited, and a wet etching process, a dry etching process or the like may be mentioned as an example. In the following explanation, the case of using the wet etching process will be described as an example.

By applying the wet etching process to the substrate 7 covered with the mask 8 in which the initial holes 81 are formed, as shown in FIG. 5C, the substrate 7 is eroded from the portions where no mask 8 is present, whereby a large number of concave portions 61 are formed on the substrate 7. As mentioned above, since the initial holes 81 formed in the mask 8 are randomly provided, the formed concave portions 61 are randomly arranged on the surface of the substrate 7.

Further, in the present embodiment, the initial concave portions 71 are formed on the surface of the substrate 7 when the initial holes 81 are formed in the mask 8 in step <A2>. This makes the contact area with the etchant increase during the etching process to the substrate, whereby the erosion can be made to start suitably.

Moreover, the formation of the concave portions 61 can be carried out suitably by employing the wet etching process. In the case where an etchant containing hydrofluoric acid (hydrogen fluoride) (that is, hydrofluoric acid-based etchant) is utilized for an etchant, for example, the substrate 7 can be eroded more selectively, and this makes it possible to form the concave portions 61 suitably.

In the case where the mask 8 is mainly constituted from chromium (that is, the mask 8 is formed of a material containing Cr as a main component thereof), a solution of ammonium hydrogen difluoride is particularly suited as a hydrofluoric acid-based etchant. Since a solution containing ammonium hydrogen difluoride (4 wt % or less aqueous solution thereof) is not poison, it is possible to prevent its influence on the human body during work and on the environment more surely. In this regard, in the case where the solution of ammonium hydrogen difluoride is used as an etchant, for example, hydrogen peroxide may be contained in the etchant. This makes it possible to accelerate the etching speed.

Further, the wet etching process permits the processing with simpler equipment than in the dry etching process, and allows the processing for a larger number of substrates at a time. This makes it possible to enhance productivity of the substrates, and it is possible to provide substrate 6 with concave portions for microlenses at a lower cost.

Figure 5D:
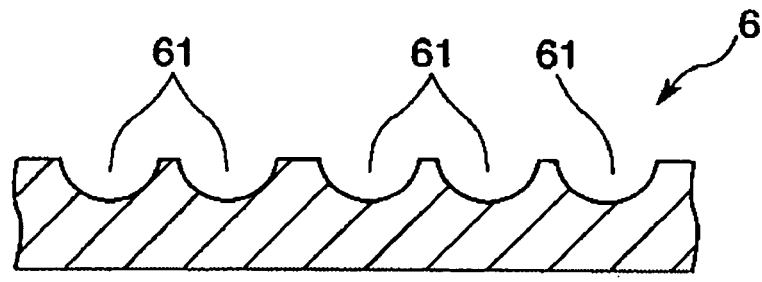

<A4> Next, the mask 8 is removed as shown in FIG. 5D (mask removal process). At this time, the rear face protective film 89 is removed along with the removal of the mask 8.

In the case where the mask 8 is mainly constituted from chromium, the removal of the mask 8 can be carried out by means of an etching process using a mixture of ceric ammonium nitrate and perchloric acid, for example.

As a result of the processing in the above, as shown in FIGS. 5D and 4, a substrate 6 with concave portions for microlenses in which a large number of concave portions 61 are randomly formed on the substrate 7 is obtained.

It is preferable that the concave portions 61 are formed on the substrate 5 with relative denseness. More specifically, it is preferable that the ratio of an area occupied by all the concave portions 61 in a usable area with respect to the entire usable area is 90% or more when viewed from a top of the substrate 7. Namely, the substrate 6 with concave portions for microlenses has the usual area in which all the concave portions 61 are formed. This makes it possible to obtain the microlens substrate 3 described above suitably.

The method of randomly forming the concave portions 61 on the substrate 7 is not particularly limited. In the case where the concave portions 61 are formed by means of the method mentioned above, namely, the method of forming the concave portions 61 on the substrate 7 by forming the initial holes 81 in the mask 8 by means of the physical method or the irradiation with laser beams and then carrying out the etching process using the mask 8, it is possible to obtain the following effects.

Namely, by forming the initial holes 81 in the mask 8 by means of a physical method or irradiation with laser beams, it is possible to form openings (initial holes 81) in a predetermined pattern in the mask 8 easily and inexpensively compared with the case of forming the openings in the mask 8 by means of the conventional photolithography method. This makes it possible to enhance productivity of the substrate 6 with concave portions for microlenses, whereby it is possible to provide the substrate 6 with concave portions for microlenses at a lower cost.

Further, according to the method described above, it is possible to carry out processing for a large-sized substrate easily. Also, according to the method, in the case of manufacturing such a large-sized substrate, there is no need to bond a plurality of substrates as the conventional method, whereby it is possible to eliminate the appearance of seams of bonding. This makes it possible to manufacture a high quality large-sized substrate with concave portions for microlenses (that is, microlens substrate) by means of a simple method at a low cost.

Moreover, after the mask 8 is removed in step <A4>, a new mask may be formed on the substrate 7, and then a series of processes including the mask formation process, the initial hole formation process, the wet etching process, and the mask removal process may be repeated. Hereinafter, a specific example will be described.

Next, a method of manufacturing the screen member 1 for a transmission screen using the substrate 6 with concave portions for microlenses described above will be described as one example of the methods of manufacturing a screen member for a transmission screen of the invention.

Figure 6A:
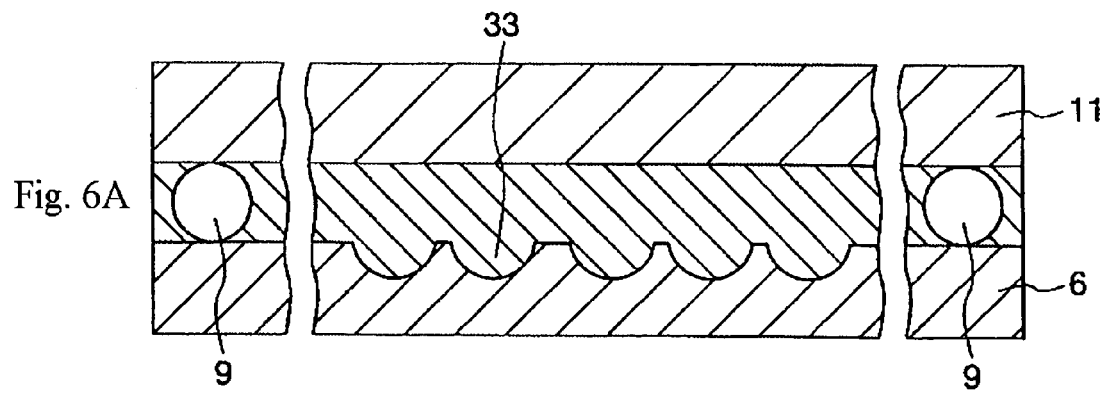
FIG. 6 is a schematic longitudinal cross-sectional view showing an example of a method of manufacturing the screen member for a transmission screen shown in FIG. 1.

<B1> First, as shown in FIG. 6A, a non-polymerized (uncured) resin 33 is applied to the face on which the concave portions 61 of the substrate 6 with concave portions for microlenses are formed. In the present embodiment, at this step, spacers 9 are provided on the region where the concave portions 66 of the substrate 6 with concave portions for microlenses are not formed, and then the resin 33 is pushed (pressed) with a flat plate 11. Thus, it is possible to control the thickness of the formed microlens substrate 3 more surely, and therefore, it is possible to control the focal points f of the respective microlenses 32 in the screen member 1 for a transmission screen finally obtained more surely.

In the case where the spacers 9 are used as this embodiment, the shape of the spacer 9 is not particularly limited, but it is preferable that it is a substantially spherical shape or substantially cylindrical shape. Further, in the case where the spacer 9 has such a shape, it is preferable that the diameter of the spacer 9 is in the range of 10 to 300 μm, and more preferably it is in the range of 30 to 200 μm. Further more preferably, it is in the range of 30 to 170 μm.

In this regard, prior to the application of the resin 33 and the pushing process with the flat plate 11, a mold release agent or the like may be applied to the face of the substrate 6 with concave portions for microlenses on which the concave portions 61 are formed or the face of the flat plate 11 with which the resin 33 is in contact when pushing the resin 33. This makes it possible to separate the microlens substrate 3 from the substrate 6 with concave portions for microlenses and the flat plate 11 easily and surely in the following steps.

Figure 6B:
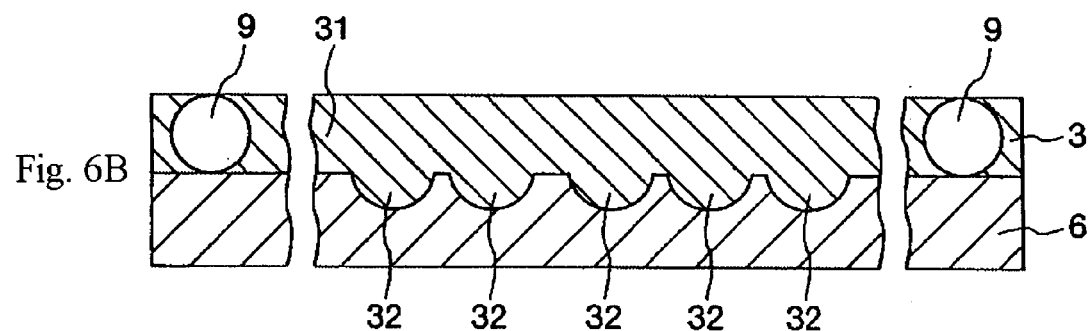

<B2> Next, the resin 33 is hardened (polymerized), and then the flat plate 11 is removed (see FIG. 6B). In this way, the microlens substrate 3 provided with the resin layer 31 and the plurality of microlenses 32 constituted from the resin filled in the plurality of concave portions 61 each of which serves-as a convex lens is obtained.

The method of curing the resin 33 is not particularly limited and appropriately selected according to the kind of the resin. For example, irradiation of light such as ultraviolet rays, heating, electron beam irradiation, or the like may be mentioned.

<B3> Next, the black matrix 4 is formed on the light emission face of the microlens substrate 3 manufactured as described above.

Figure 6C:
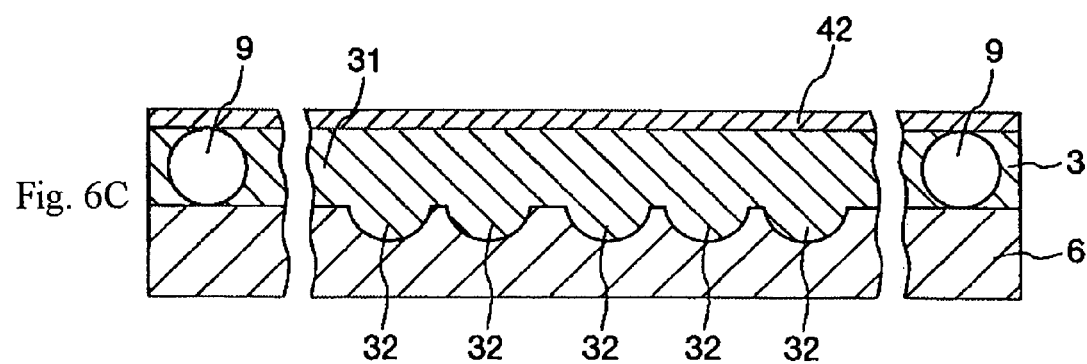

First, as shown in FIG. 6C, a first material including a positive photopolymer having light shielding (blocking) effect is applied onto the light emission face of the microlens substrate 3 to form a first layer 42. As the method of applying the first material onto the surface of the microlens substrate 3, for example, a dip coat method, a doctor blade method, a spin coat method, a blush coat method, and various types of coating methods such as a spray coating, an electrostatic coating, an electrodeposition coating, roll coater and the like can be utilized. The first material may be constituted from a resin (photopolymer) having light shielding (blocking) effect, or may be one in which a material having light shielding (blocking) effect is dispersed or dissolved to a resin material having low light shielding (blocking) effect. Heat treatment such as a prebake process, for example, may be carried out after applying the first material (that is, after forming the first layer 42) if needed.

Figure 6D:
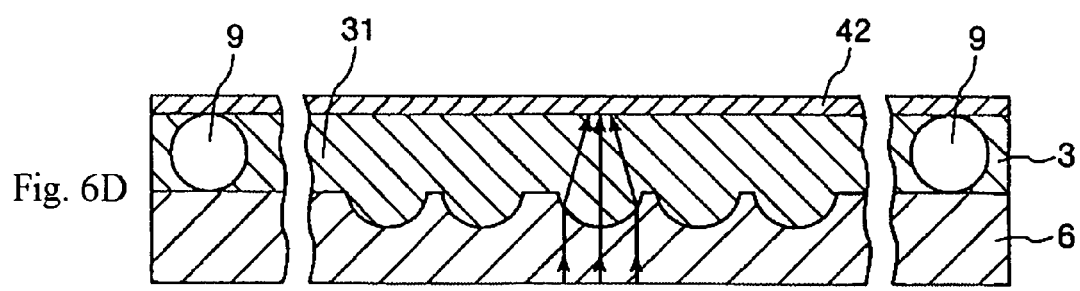

<B4> Next, as shown in FIG. 6D, light Lb for exposure is irradiated to the microlens substrate 3 in a direction perpendicular to the light incident face of the microlens substrate 3. The irradiated light Lb for exposure is condensed by passing through each of the microlenses 32. The first layer 42 in the vicinity of the focal point f of each of the microlenses 32 is exposed, and the first layer 42 corresponding to portions other than the vicinity of the focal points f is not exposed or slightly exposed (that is, the degree of exposure is small). In this way, only the first layer 42 (positive photopolymer) in the vicinity of the respective focal points f is exposed.

Figure 6E:
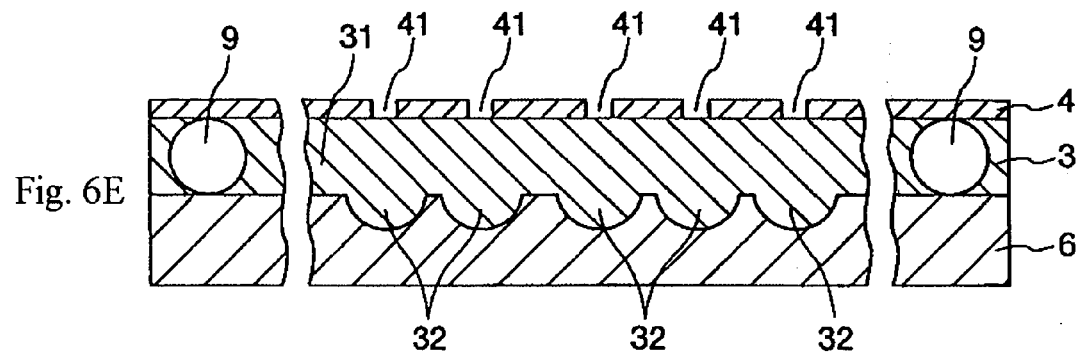

The development is then carried out. In this case, since the first layer 42 includes a positive photopolymer, the exposed first layer 42 in the vicinity of the respective focal points f is melt and removed by the development. As a result, as shown in FIG. 6E, the black matrix 4 in which the openings 41 are formed on the portions corresponding to the optical axes L of the microlenses 32 is formed. The developing method may be selected arbitrarily depending on composition of the first material (constituent material of the first layer) or the like. For example, the development of the positive photopolymer 42 in this embodiment can be carried out using an alkaline aqueous solution such as a solution of potassium hydroxide or the like.

Further, heat treatment such as a prebake process may be carried out after exposing the positive photopolymer 42 if needed.

<B5> Next, the light diffusion portions 5 are formed on the portions corresponding to the openings 41 of the black matrix 4 formed in this way.

Figure 6F:
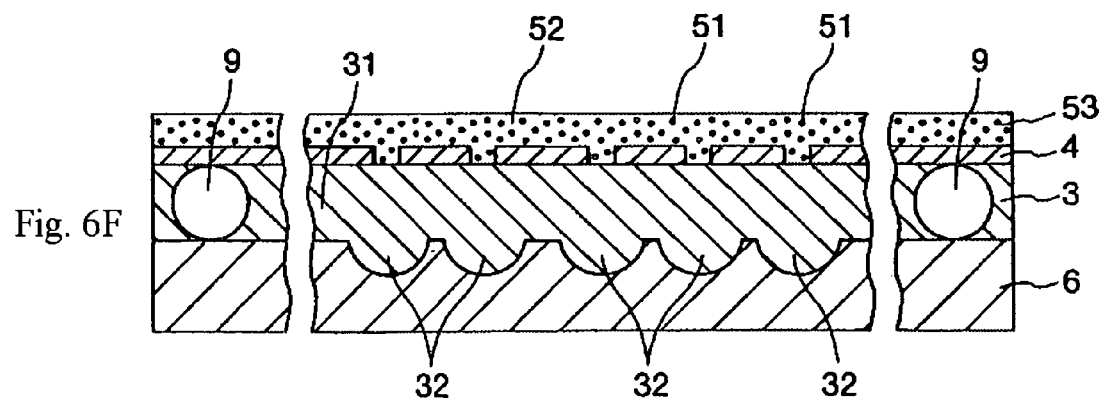

First, as shown in FIG. 6F, a second material is applied onto the light emission face of the microlens substrate 3 (that is, onto the face on which the black matrix 4 was formed) to form a second layer 53. The second material includes at least a negative photopolymer, and in this embodiment, the second material is one in which the diffusion media 51 are dispersed into a negative photopolymer 52. As the method of applying the second material, for example, a dip coat method, a doctor blade method, a spin coat method, a blush coat method, and various types of coating methods such as a spray coating, an electrostatic coating, an electrodeposition coating, roll coater and the like can be utilized.

For example, CSP-SO25 (made by FUJI FILM ARCH) or the like can be used as a negative photopolymer 52.

Further, for example, silica, grass, resin or the like in the form of particulates (beads) can be used as the diffusion media 51. Although an average grain diameter of the diffusion media 51 is not particularly limited, it is preferable that the average grain diameter of the diffusion media 51 is in the range of 1.0 to 50 µm, and more preferably it is in the range of 2.0 to 10 µm. Moreover, heat treatment such as a prebake process, for example, may be carried out after applying the second material (that is, after forming the second layer 53) if needed.

<B6> Next, as shown in FIG. 6G, light Lc for exposure is irradiated to the microlens substrate 3 in a direction perpendicular to the light incident face of the microlens substrate 3. The irradiated light Lc for exposure is condensed by passing through each of the microlenses 32 and focused at the points (that is, focal points f) corresponding to the optical axes L of the respective microlenses 32. The second layer 53 in the vicinity of the focal point f of each of the microlenses 32 is exposed, and the second layer 53 corresponding to portions other than the vicinity of the focal points f is not exposed or slightly exposed (that is, the degree of exposure is small). In this way, only the second layer 53 (the negative photopolymer 52) in the vicinity of the respective focal points f is exposed.

The development is then carried out. In this case, since the photopolymer 42 is a negative photopolymer, the exposed photopolymer 52 corresponding to the portions other than the vicinity of the respective focal points f is melt and removed by the development. As a result, as shown in FIG. 6H, the light diffusion portions 5 are formed on the portions corresponding to the optical axes L of the microlenses 32, that is, the portions corresponding to the openings 41 of the black matrix 4.

In this way, in the present invention, the light condensed by the lens portions (microlenses) is irradiated to the second layer made of the second material including a negative photopolymer, and the second layer is then developed so that portions of the second layer that have exposed by the condensed light remain as they are, whereby the light diffusion portions are formed. This makes it possible to obtain a transmission screen (screen member for a transmission screen) having excellent angle of view characteristics and light use efficiency easily and surely. To explain it in more detail, by carrying out the exposure using the light condensed by the lens portions, it is possible to selectively form the light diffusion layer (light diffusion portions) on the portions corresponding to the openings of the light shielding layer (black matrix). As a result, in the obtained transmission screen (screen member for a transmission screen), it is possible to diffuse the light (photons) condensed by the lens portions to the light emission face of the lens substrate efficiently while effectively preventing the extinction of the light, whereby it is possible to improve the angle of view characteristics and light use efficiency of the transmission screen provided with the screen member for a transmission screen manufactured by the method of the invention. Further, according to the invention, as the constitution shown in the drawings, it is possible to form the light diffusion portions 5 easily and surely so that the portions corresponding to the openings 41 become the protrusions that protrude from the surface of the black matrix 4. Moreover, according to the invention, as the constitution shown in the drawings, it is possible to form the plurality of light diffusion portions 5 on the portions corresponding to the openings 41 easily and surely so that the light diffusion portions are independently formed with each other.

In this regard, heat treatment such as a prebake process may be carried out after exposing the positive photopolymer 42 if needed.

Further, when the light for exposure is irradiated to the microlens substrate 3, for example, the positional relationship between a light source of the light for exposure and the microlens substrate 3 may be changed with time. Namely, the light source and the microlens substrate 3 may be moved relatively while irradiating the light to the microlens substrate 3. Thus, for example, it is possible to form the light diffusion portions 5 effectively even in the case where the light diffusion portions 5 to be formed are relatively large.

<B7> Then, the screen member 1 for a transmission screen is obtained by removing the substrate 6 with concave portions for microlenses from the screen member 1 for a transmission screen (see FIG. 6I). Since the substrate 6 with concave portions for microlenses can be utilized repeatedly to manufacture the screen members 1 for a transmission screen by removing the substrate 6 with concave portions for microlenses in this manner, this method is preferable in terms of the manufacturing cost of the screen member 1 for a transmission screen and stability of the quality of the manufactured screen member 1 for a transmission screen.

In this regard, the substrate 6 with concave portions for microlenses is not necessarily removed from the screen member 1 for a transmission screen. In other words, the transmission screen 10 may be provided with the substrate 6 with concave portions for microlenses.

As described above, since the black matrix 4 and the light diffusion portions 5 are formed by irradiating the light for exposure condensed by the microlenses 32 to the photopolymers in the manufacturing method of the invention, it is possible to form the light diffusion portions 5 and the black matrix 4 having the openings 41 and it is possible to selectively form the openings 41 and the light diffusion portions 5 with a fine location accuracy. Therefore, the obtained screen member 1 for a transmission screen (the transmission screen 10) can have excellent angle of view characteristics and light use efficiency. Further, according to the invention, the screen member 1 for a transmission screen can be constructed so as to be provided with a region where the height of the light diffusion portion 5 is a relative low or a region where the light diffusion portion 5 is not formed between adjacent protrusions. This makes it possible to fulfill the function of the black matrix (light shielding layer) 4 more effectively, and therefore, it is possible to improve the contrast of an image projected to a screen particularly.

Moreover, in the case where the plurality of microlenses 32 in the microlens substrate 3 have substantially same curvature radii with each other, the light condensed by each of the microlenses 32 is focused on a substantially same plane. Therefore, by evenly irradiating the light for exposure onto the light incident face of the microlens substrate 3, it is possible to form the openings 41 of the black matrix (light shielding layer) 4 and the light diffusion portions 5 having substantially the same size with each other.

Hereinafter, a description will be given for a rear projection using the transmission screen described above.

Figure 7:
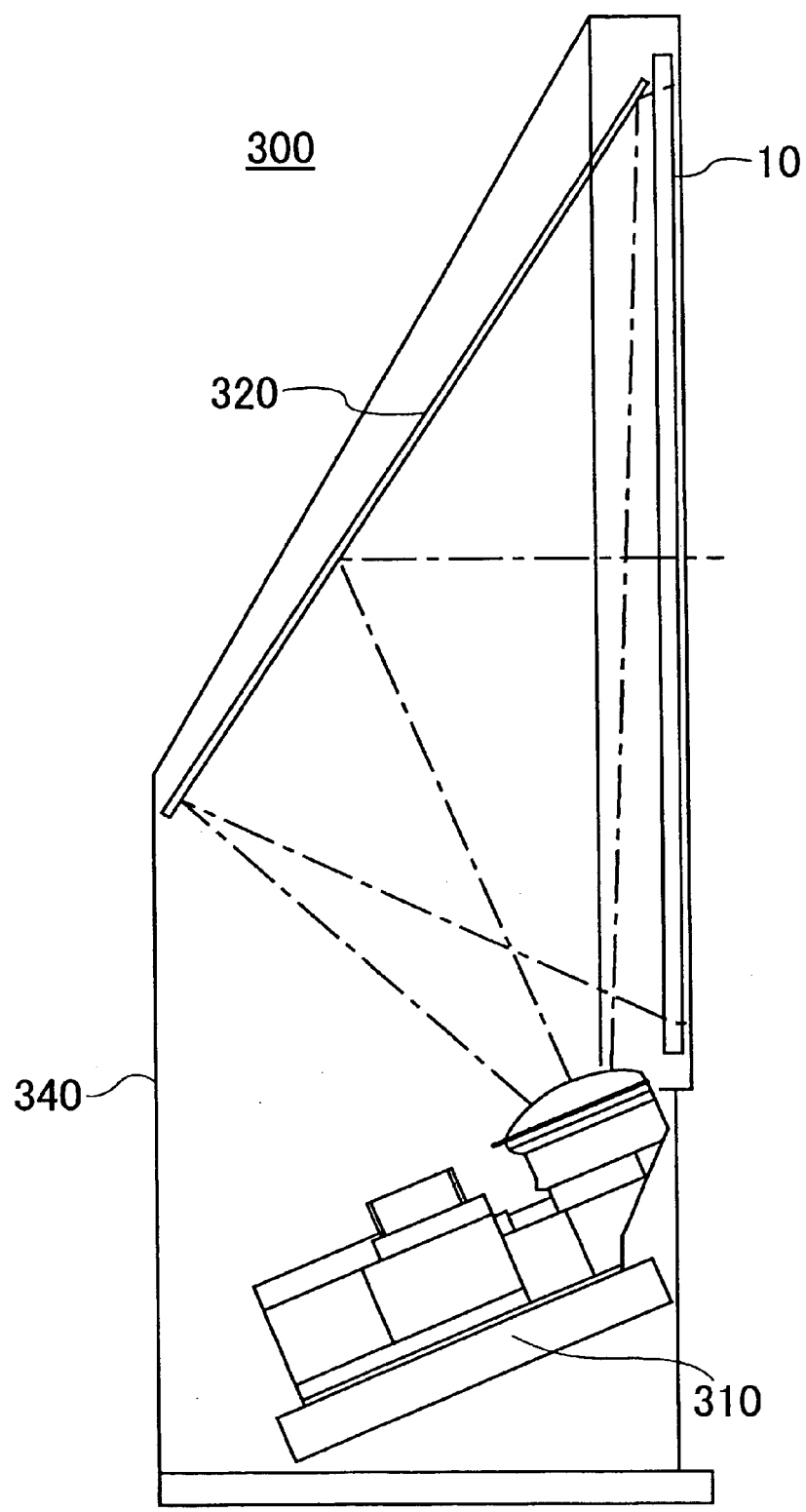
FIG. 7 is a drawing schematically showing a rear projection to which the transmission screen of the present invention is applied.

FIG. 7 is a diagram schematically showing a structure of the rear projection according to the present invention.

As shown in FIG. 7, a rear projection 300 has a structure in which a projection optical unit 310, a light guiding mirror 320 and a transmission screen 10 are arranged in a casing 340.

Since the rear projection 300 uses the transmission screen 10 that has excellent angle of view characteristics and light use efficiency as described above as its transmission screen 10, it forms an excellent rear projection having a high display quality.

Further, since the microlenses 32 are in particular arranged in a random manner (in an optically random manner) in the screen member 1 for a transmission screen described above, the rear projection 300 hardly generates problems such as moire.

As described above, it should be noted that, even though the method of manufacturing the screen member for a transmission screen, the screen member for a transmission screen, the transmission screen and the rear projection according to the present invention have been described with reference to the preferred embodiments shown in the accompanying drawings, the present invention is not limited to these embodiments.

For example, each element (component) constituting the screen member for a transmission screen, the transmission screen and the rear projection may be replaced with one capable of performing the same or a similar function.

Figure 8:
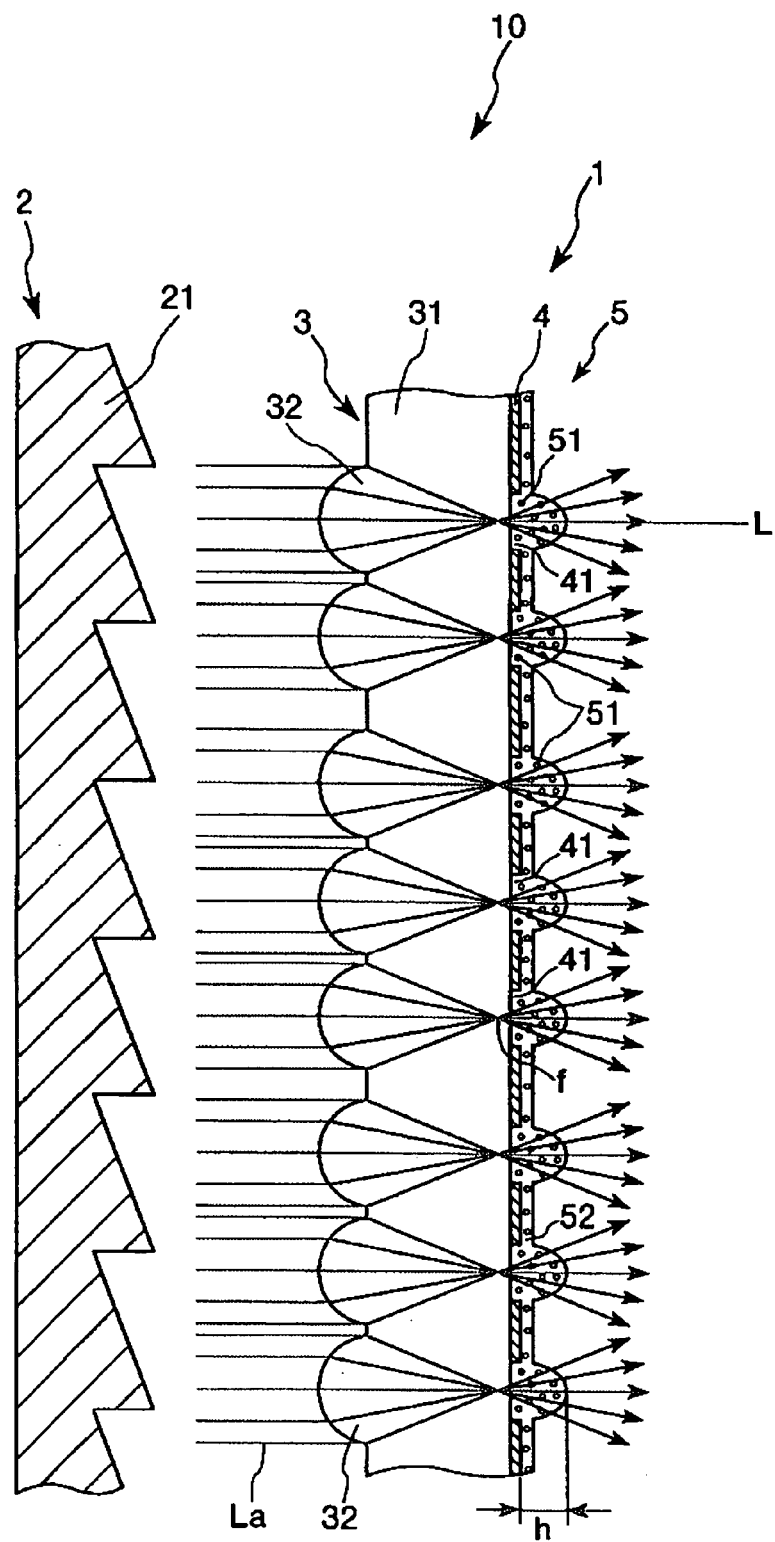
FIG. 8 is a cross-sectional view schematically showing a screen member for a transmission screen and a transmission screen of the present invention in another embodiment according to the present invention.

Further, in the embodiment described above, even though it has been described that each of the microlenses (lens portions) 32 has a focal point on the side of the light emission face of the microlens substrate 3 beyond black matrix 4, the focal point of the lens portion may be located in the microlens substrate 3 short of the black matrix 4 (see FIG. 8).

Moreover, in the embodiment described above, even though it has been described that the substrate manufactured using the substrate 6 with concave portions for microlenses was utilized as the microlens substrate (lens substrate) 3, any lens substrate (lens substrate manufactured by any method) may be utilized as the microlens substrate 3.

Furthermore, in the embodiment described above, even though it has been described that the initial concave portions 71 were formed on the substrate 7 in addition to the initial holes 81 in the initial hole formation process of the method of manufacturing the substrate with concave portions for microlenses, such initial concave portions 71 need not be formed. By the forming conditions of the initial holes 81 (for example, energy intensity of the laser, beam diameter, irradiation time, or the like), it is possible to selectively form the initial concave portions 71 each having a desired shape in addition to the initial holes 81, or only the initial holes 81 so that the initial concave portions 81 are not formed.

Further, in the embodiment described above, even though it has been described that the black matrix (light shielding layer) 4 and the light diffusion portions 5 are formed while the substrate 6 with concave portions for microlenses are made to stick (be close) to the microlens substrate 3, the black matrix (light shielding layer) 4 and the light diffusion portions 5 may be formed, for example, while the substrate 6 with concave portions for microlenses is removed from the microlens substrate 3.

Moreover, it has been described that the microlenses 32 each having a substantially circular shape when viewed from the top of the microlens substrate 3 are randomly arranged, but the shape and arrangement of the microlenses 32 are not limited to the above. For example, the microlenses 32 may be arranged in a lattice-like pattern, or may be formed in a honeycombed pattern.

Furthermore, it has been described that the transmission screen 10 is provided with the screen member I for a transmission screen and the Fresnel lens 21 in the above embodiment, the transmission screen 10 of the invention need not be provided with the Fresnel lens 21 necessarily. For example, the transmission screen 10 may be constructed from only the screen member 1 for a transmission screen of the invention practically.

Further, it has been described for the structure where the microlens substrate 3 (lens substrate) is provided with the microlenses 32 as lens portions in the above embodiment, the lens portion is not limited to the microlens 32. For example, the lens portion may be a lenticular lens. By using the lenticular lenses, it is possible to simplify the manufacturing step for the lens portions, and therefore, it is possible to improve the productivity of the transmission screen 10. In the case where the lenticular lenses are used as the lens portions, a stripe-shaped light shielding layer (black stripe) is formed on the light emission face of the lens substrate in place of the black matrix 4. In this case, the light diffusion portions 5 are provided on at least portions corresponding to spaces between adjacent strips constituting the black stripe. Even in such a structure, it is possible to obtain the function and effect similar to the embodiment described above. Namely, according to the invention, it is possible to direct the light entering the light diffusion portions 5 (the incident light) to the light emission face of the lens substrate efficiency while sufficiently diffusing the incident light. Hence, even in the case where the lens substrate is provided with the lenticular lenses as the lens portions, it is possible to obtain excellent angle of view characteristics (that is, it is possible to increase the vertical angle of view of the transmission screen in addition to the horizontal angle of view thereof).

Moreover, it has been described that the entire light diffusion portion 5 is formed as the protrusion, that is, each of the light diffusion portions 5 is substantially constructed from only the protrusion in the above embodiment, but the light diffusion portions may have regions except for the protrusions (see FIG. 8).

Further, it has been described that the substrate 6 with concave portions for microlenses is removed from the microlens substrate 3 after forming the light diffusion portions 5 in the above embodiment, the substrate 6 with concave portions for microlenses may be removed before forming the black matrix 4 or the light diffusion portions 5, or it may be housed (incorporated) in the transmission screen 10 without being removed from the microlens substrate 3.

EXAMPLE

Example 1

A substrate with concave portions for microlenses equipped with concave portions for microlenses was manufactured, and then a microlens substrate was manufactured using the substrate with concave portions for microlenses in the following manner.

First, a soda-lime glass substrate having a rectangle of 1.2 m×0.7 m and a thickness of 4.8 mm was prepared.

The substrate of soda-lime glass was soaked in cleaning liquid containing 4 wt % ammonium hydrogen difluoride and 8 wt % hydrogen peroxide to carry out a 6 μm etching process, thereby cleaning its surface.

Then, cleaning with pure water and drying with nitrogen ($N_2$) gas (for removal of pure water) were carried out.

Next, chromium films (a mask and a rear face protective film) each having a thickness of 0.03 μm were formed on the soda-lime glass substrate by means of a sputtering method. Namely, a mask and a rear face protective film each made of a chromium film were formed on both surfaces of the substrate of soda-lime glass.

Next, laser machining was carried out to the mask to form a large number of initial holes within a region of 113 cm×65 cm at the central part of the mask.

In this regard, the laser machining was carried out using a YAG laser under the conditions of energy intensity of 1 mW, a beam diameter of 3μm, and an irradiation time of $60 \times 10^{-9}$ sec.

In this way, the initial holes were formed in a random pattern over the entire region of the mask mentioned above. The average diameter of the initial holes was 5 μm, and the formation density of the initial holes was 40,000 holes/cm².

In addition, at this time, concave portions each having a depth of about 0.1 μm and a damaged layer (or affected layer) were formed on the surface of the soda-lime glass substrate.

Next, the soda-lime glass substrate was subjected to a wet etching process, thereby forming a large number of concave portions on the soda-lime glass substrate. The large number of formed concave portions had substantially the same curvatures (35 μm) as each other.

In this regard, an aqueous solution containing 4 wt % ammonium hydrogen difluoride and 8 wt % hydrogen peroxide was used for the wet etching as an etchant, and the soak time of the substrate was 5 hours.

Next, the chromium oxide films (the mask and rear face protective film) were removed by carrying out an etching process using a mixture of ceric ammonium nitrate and perchloric acid.

Then, cleaning with pure water and drying with $N_2$ gas (removal of pure water) were carried out.

As a result, a wafer-like substrate with concave portions for microlenses where a large number of concave portions for microlenses were randomly formed on the soda-lime glass substrate was obtained. The ratio of an area occupied by all the concave portions in a usable area where the concave portions are formed to the entire usable area was 97% when viewed from the top of the obtained substrate with concave portions. A large number of distances between arbitrarily adjacent two points (that is, between a concave portion and an adjacent concave portion) were obtained, and then a standard deviation of these distances was calculated. The standard deviation obtained by such a calculation was 35% of the average value of the large number of distances.

Next, a mold release agent (GF-6110) was applied to the face of the substrate with concave portions for microlenses obtained as described above on which the concave portions were formed, and a non-polymerized (uncured) ultraviolet-ray (UV) curing resin (UV-cure resin) (V-2403 (made by Nippon Steel Chemical Co., Ltd.)) was applied to the same face side. At this time, substantially spherical-shaped spacers (each having a diameter of 150 μm) were arranged at regions (that is, unusable lens regions) on the above-mentioned face where the concave portions of the substrate with concave portions for microlenses were not formed.

Next, the UV-cure resin was pressed (pushed) with a flat plate constituted from alkali-free glass. At this time, this process was carried out so that air was not intruded between the flat plate and the UV-cure resin. In this case, a mold release agent (GF-6110) was applied in advance onto the face of the flat plate with which the UV-cure resin has been in contact when pushing the UV-cure resin.

Then, by irradiating ultraviolet rays of 10,000 mJ/cm² through the flat plate, the UV-cure resin was cured to obtain the microlens substrate. The index of refraction of the obtained microlens substrate was 1.5. Further, the thickness of the resin layer in the obtained microlens substrate was 40μm, and the curvature radius and diameter of each of the plurality of microlenses were respectively 35 μm and 70 μm. Moreover, the ratio of the total area (projected area) occupied by the microlenses with respect to the usable area of the microlens substrate when viewed from the top of the light incident face of the microlens substrate was 97%.

Next, the flat plate was removed.

Next, a first material including a positive photopolymer (PC405G (made by JSR Corporation)) and a light shielding material (carbon black) was applied to the light emission face of the microlens substrate (that is, the face opposite to the face on which the microlenses were formed) with a roll coater to form a first layer. The light shielding material content of the first material was 20 wt %.

Next, a prebake process of 90° C. for 30 minutes was applied to the microlens substrate.

Next, ultraviolet rays as parallel light of 80 mJ/cm$^2$ were irradiated to the substrate with concave portions for microlenses from the face opposite to the face where the concave portions were formed. In this case, the irradiated ultraviolet rays were condensed by the respective microlenses, and the first layer (photopolymer) in the vicinity of the focal points f of the microlenses was exposed selectively.

Subsequently, a developing process was applied to the screen member for a transmission screen for 40 seconds using an aqueous solution of potassium hydroxide of 0.5 wt % as a developing fluid.

Subsequently, cleaning with pure water and drying with nitrogen (N$_2$) gas (for removal of pure water) were carried out. Further, a postbake process of 200° C. for 30 minutes was applied to the microlens substrate. In this way, the black matrix having a plurality of openings corresponding to the respective microlenses was formed. The thickness of the black matrix was 2 μm, and the diameter of the opening was 45 μm.

Subsequently, a second material including a negative photopolymer (CSP-SO25 (made by FUJI FILM ARCH)) the light diffusion media (silica beads each having the diameter of 5 μm) was applied to the face on which the black matrix has been formed (the light emission face of the microlens substrate) with a roll coater to form a second layer. The thickness of the applied second layer was 10 μm. Further, the light diffusion media content of the second material was 25 wt %.

Next, a prebake process of 90° C. for 30 minutes was applied to the microlens substrate.

Next, ultraviolet rays as parallel light of 100 mJ/cm$^2$ was irradiated to the substrate with concave portions for microlenses from the face opposite to the face where the concave portions were formed. In this case, the irradiated ultraviolet rays were condensed by the respective microlenses, and the second material (photopolymer) in the vicinity of the focal points f of the microlenses was exposed selectively.

Subsequently, a developing process was applied to the screen member for a transmission screen for 40 seconds using CD-2000 (made by FUJI FILM ARCH) as a developing fluid.

Subsequently, cleaning with pure water and drying with nitrogen (N$_2$) gas (for removal of pure water) were carried out. Further, a postbake process of 200° C. for 30 minutes was applied to the microlens substrate. In this way, convex-shaped light diffusion portions (protrusions) were formed on the portions corresponding to the plurality of openings. The height of the formed light diffusion portion was 5 μm. In this regard, the formed light diffusion portions were formed into the protrusions, and a flat portion (the surface thereof was parallel to the light emission face of the microlens substrate) was not formed on the portions (where the protrusions were not formed) shorter than the height of the apex of each of the protrusions was not formed on the black matrix.

Subsequently, the screen member for a transmission screen was obtained by removing the substrate with concave portions for microlenses from the screen member.

In the screen member for a transmission screen obtained in this manner, the focal point f of each of the microlenses was located at the portion that was apart from the light emission face of the black matrix by 3 μm in the direction of the light emission when parallel light entered the screen member for a transmission screen from the face where the microlenses were formed. Further, the ratio of the total area (projected area) occupied by the light diffusion portions as the protrusions with respect to the total area occupied by the microlenses when viewed from the top of the screen member for a transmission screen was 70%. Moreover, the ratio of the total area (projected area) occupied by the openings with respect to the total area occupied by the microlenses when viewed from the top of the screen member for a transmission screen was 50%.

By assembling the screen member for a transmission screen manufactured as described above and a Fresnel lens portion manufactured by extrusion molding, the transmission screen as shown in FIG. 3 was obtained.

Example 2

The transmission screen was manufactured in the manner similar to that in Example 1 except that each of the mask and the rear face protective film was formed as the chromium oxide film. In this case, the mask and the rear face protective film were formed using a spattering method. The thickness of the chromium oxide film was 0.03 μm.

Example 3

The transmission screen was manufactured in the manner similar to that in Example 1 except that each of the mask and the rear face protective film was formed as the laminated element of chromium/chromium oxide film (that is, the laminated element in which the chromium oxide was laminated on the outer surface of the chromium). In this case, the mask and the rear face protective film were formed using a spattering method. The thickness of the chromium film was 0.02 μm, and the thickness of the chromium oxide film was 0.02 μm.

Example 4

The transmission screen was manufactured in the manner similar to that in Example 1 except that each of the mask and the rear face protective film was formed as the laminated element of chromium oxide/chromium film (that is, the laminated element in which the chromium was laminated on the outer surface of the chromium oxide). In this case, the mask and the rear face protective film were formed using a spattering method. The thickness of the chromium oxide film was 0.02 μm, and the thickness of the chromium film was 0.02 μm.

Comparative Example 1

A microlens substrate was manufactured in the method similar to that described above using the substrate with concave portions for microlenses manufactured in Example 1 described above.

Next, the flat plate used to press the UV-cure resin was removed, and a composition in which the carbon black as a light shielding material was dispersed into PC-403 (made by JSR Corporation) was applied to the light emission face of the microlens substrate (that is, the surface of the exposed microlenses substrate) with a roll coater. Then, heat treatment of 90° C. for 30 minutes was applied to the microlens substrate, whereby the composition was cured and a light shielding coat was formed.

Subsequently, the formation of the mask with the photolithography method (that is, by irradiating light having a predetermined pattern to the face of the microlens substrate where the light shielding coat has been formed) and an etching process were applied to the microlens substrate. Then, heat treatment of 200° C. for 60 minutes was applied to the microlens substrate to cure the composition, whereby the black matrix having the openings on the portions corresponding to the respective microlenses on the light shielding coat was formed. The thickness of formed black matrix was 2 μm, and the diameter of the opening was 45 μm.

Next, a composition in which the light diffusion media (silica beads each having the diameter of 5 μm) were dispersed into the negative photopolymer (CSP-SO25 (made by FUJI FILM ARCH)) was applied to the entire face on which the black matrix has been formed (the light emission face of the microlens substrate) with a roll coater. Then, heat treatment of 200° C. for 60 minutes was applied to the microlens substrate, whereby the composition was cured and a layer-like light diffusion portion was formed. The thickness of the formed light diffusion portion (light diffusion layer) was 6 μm.

Subsequently, the screen member for a transmission screen was obtained by removing the substrate with concave portions for microlenses from the screen member.

By assembling the screen member for a transmission screen manufactured as described above and a Fresnel lens portion manufactured by extrusion molding, the transmission screen was obtained.

Comparative Example 2

First, a soda-lime glass substrate having a rectangle of 1.2 m×0.7 m and a thickness of 4.8 mm was prepared.

The substrate of soda-lime glass was soaked in cleaning liquid containing 4 wt % ammonium hydrogen difluoride and 8 wt % hydrogen peroxide to carry out a 6 μm etching process, thereby cleaning its surface.

Then, cleaning with pure water and drying with nitrogen ($N_2$) gas (removal of pure water) were carried out.

Next, chromium films (a mask and a rear face protective film) each having a thickness of 0.03 μm were formed on the soda-lime glass substrate by means of a sputtering method. Namely, a mask and a rear face protective film each made of a chromium film were formed on the surface of the substrate of soda-lime glass.

Next, laser machining was carried out to the mask to form a large number of linear grooves (holes) that were parallel to each other within a region of 113 cm×65 cm at the central part of the mask. A pitch between adjacent linear grooves was 70 μm.

In this regard, the laser machining was carried out using a YAG laser under the conditions of energy intensity of 1 mW, a beam diameter of 3 μm, and an irradiation time of $60 \times 10^{-9}$ sec. Next, the soda-lime glass substrate was subjected to a wet etching process, thereby forming groove-like concave portions on the soda-lime glass substrate. The formed concave portions had substantially the same curvatures (35 μm) as each other.

In this regard, an aqueous solution containing 4 wt % ammonium hydrogen difluoride and 8 wt % hydrogen peroxide was used for the wet etching as an etchant, and the soak time of the substrate was 5 hours.

Next, the chromium oxide films (the mask and rear face protective film) were removed by carrying out an etching process using a mixture of ceric ammonium nitrate and perchloric acid.

Then, cleaning with pure water and drying with $N_2$ gas (removal of pure water) were carried out.

As a result, a wafer-like substrate with concave portions for lenticular lenses where a large number of concave portions (grooves) for lenticular lenses were formed on the soda-lime glass substrate was obtained.

Next, a mold release agent (GF-6110) was applied to the face of the substrate with concave portions for lenticular lenses obtained as described above on which the concave portions were formed, and a non-polymerized (uncured) ultraviolet-ray (UV) curing resin (UV-cure resin) (V-2403 (made by Nippon Steel Chemical Co., Ltd.)) was applied to the same face side. At this time, substantially spherical-shaped spacers (each having a diameter of 30 μm) were arranged at regions on the above face where the concave portions of the substrate with concave portions for lenticular lenses were not formed.

Next, the UV-cure resin was pressed (pushed) with a flat plate constituted from alkali-free glass. At this time, this process was carried out so that air was not intruded between the flat plate and the UV-cure resin. In this case, a mold release agent (GF-6110) was applied in advance onto the face of the flat plate with which the UV-cure resin has been in contact when pushing the UV-cure resin.

Then, by irradiating ultraviolet rays of 10,000 mJ/cm$^2$ through the flat plate, the UV-cure resin was cured to obtain the lenticular lens substrate. The index of refraction of the obtained lenticular lens substrate was 1.5. Further, the thickness of the resin layer in the obtained lenticular lens substrate was 150 μm, and the curvature radius of each of the plurality of lenticular lenses were respectively 35 μm.

Next, the flat plate used to press the UV-cure resin was removed, and a composition in which the carbon black as a light shielding material was dispersed into PC-403 (made by JSR Corporation) was applied to the light incident face of the lenticular lens substrate (the surface of the exposed lenticular lenses substrate, that is, the face on which the lenticular lenses were formed) with a roll coater. Then, heat treatment of 200° C. for 60 minutes was applied to the lenticular lens substrate, whereby the composition was cured and a light shielding coat was formed.

Subsequently, the formation of the mask with the photolithography method (that is, by irradiating light having a predetermined pattern to the face of the lenticular lens substrate where the light shielding coat has been formed) and an etching process were applied to the microlens substrate, whereby the black stripe (light shielding layer) having the openings on the portions corresponding to the respective lenticular lenses on the light shielding coat was formed. The thickness of formed black stripe was 2 μm, and the width of the opening was 35 μm.

Next, a composition in which the light diffusion media (silica beads each having the diameter of 5 μm) were dispersed into the negative photopolymer (CSP-SO25 (made by FUJI FILM ARCH)) was applied to the entire face on which the black stripe has been formed (the light emission face of the lenticular lens substrate) with a roll coater. Then, heat treatment of 200° C. for 60 minutes was applied to the microlens substrate, whereby the composition was cured and a layer-like light diffusion portion was formed. The thickness of the formed light diffusion portion (light diffusion layer) was 40 μm.

Subsequently, the screen member for a transmission screen was obtained by removing the substrate with concave portions for lenticular lenses from the screen member.

By assembling the screen member for a transmission screen manufactured as described above and a Fresnel lens portion manufactured by extrusion molding, the transmission screen was obtained.

(Evaluation for a Transmission Screen)

The light use efficiency of the transmission screen manufactured in each of Examples 1 to 4 and Comparative Examples 1 and 2 was measured. The measurement for the light use efficiency was carried out under the conditions in which the ratio of the amount of light transmitting the transmission screen of each of these Examples with respect to the amount of light without any transmission screen was measured using a spectrophotometer with an integrating sphere.

As a result, in the transmission screen manufactured in each of Examples 1 to 4, the excellent light use efficiency of 70% can be obtained. On the other hand, in the transmission screens manufactured in Comparative Examples 1 and 2, the mere light use efficiency of 55% and 52% was obtained, respectively.

(Manufacture of a Rear Projection and Evaluation thereof)

A rear projection as shown in FIG. 7 was manufactured (assembled) using the transmission screen manufactured in each of Examples 1 to 4 and Comparative Examples 1 and 2.

The measurement of angles of view in both horizontal and vertical directions was carried out while a sample image was displayed on the transmission screen in each of the obtained rear projections.

The measurement of the angles of view was carried out under the conditions in which the measurement was carried out at intervals of five degrees with a gonio photometer.

As a result, it was confirmed that the rear projection provided with the transmission screen obtained in Example 1 had excellent angle of view characteristics in which the angle of view in the horizontal direction (the angle at which the amount of light become half) was 22° and the angle of view in vertical direction was 22°. Further, in this rear projection, the image was brightly displayed and occurrence of moire was not recognized. In addition, in the rear projections provided with the respective transmission screens obtained in Examples 2 to 4, the similar effect was also obtained.

On the other hand, in the rear projections provided with the respective transmission screens obtained in Comparative Examples 1 and 2, sufficient characteristics cannot be obtained.

Namely, in the rear projection provided with the transmission screen obtained in Comparative Example 1, the angles of view in the vertical and horizontal directions were respectively 18°, 18°. Further, in the rear projection provided with the transmission screen obtained in Comparative Example 2, the angles of view in the vertical and horizontal directions were respectively 8° and 23°. The rear projections with transmission screens obtained in Comparative Examples 1 and 2 had inferior angle of view characteristics, respectively. In addition, the image projected on the transmission screen in each of the rear projections of Comparative Examples 1 and 2 was dark in comparison with each of the rear projections of the present invention (that is, the rear projections of Examples 1 to 4).

This application claims priority to Japanese Patent Application No. 2003-316016 filed Sep. 8, 2003, which is expressly incorporated by reference herein in its entirety.

What is claimed is:

1. A method of manufacturing a screen member for a transmission screen, the method comprising the steps of:
preparing a lens substrate having a light incident face and a light emission face opposite to the light incident face, the light incident face of the lens substrate being formed with a plurality of lens portions for condensing incident light;
forming a light shielding layer from a first layer on the light emission face of the lens substrate so that the light shielding layer has a plurality of openings on light paths of the light that has been transmitted by the lens portions of the lens substrate; and
forming a plurality of light diffusion portions for diffusing the light that has been transmitted by each lens portion of the lens substrate;
wherein the light shielding layer forming step includes:
forming the first layer on the light emission face of the lens substrate by applying a material including a positive photopolymer onto the light emission face of the lens substrate;
exposing the first layer by allowing light to enter the lens substrate from the light incident face thereof so that the light is condensed by each of the lens portions and then the first layer is irradiated by the condensed light; and
developing the first layer so that portions of the first layer that have been exposed by the condensed light are removed to thereby form the plurality of openings, and
wherein the light diffusion portions forming step includes:
forming a second layer on the light shielding layer by applying a material including a negative photopolymer onto the light shielding layer;
exposing the second layer by allowing light to enter the lens substrate from the light incident face thereof so that the light is condensed by each of the lens portions and then the second layer is irradiated by the condensed light; and
developing the second layer so that portions of the second layer that have been exposed by the condensed light remain as the plurality of light diffusion portions.

2. The method as claimed in claim 1, wherein each of the lens portions of the lens substrate is designed so that the light entering each lens portion is focused on the side of the light emission face of the lens substrate beyond the light shielding layer.

3. The method as claimed in claim 1, wherein each of the light diffusion portions is formed into a protrusion that protrudes from the surface of the light shielding layer at a position where the corresponding opening of the light shielding layer is located.

4. The method as claimed in claim 3, wherein the ratio of the total area occupied by the protrusions with respect to the total area occupied by the lens portions when viewed from the top of the light incident face of the lens substrate is in the range of 5 to 99%.

5. The method as claimed in claim 3, wherein the plurality of light diffusion portions in the form of the protrusions are independently formed with each other.

6. The method as claimed in claim 1, wherein the ratio of the total area occupied by the light diffusion portions with respect to the total area occupied by the lens portions when viewed from the top of the light incident face of the lens substrate is in the range of 5 to 99%.

7. The method as claimed in claim 1, wherein the screen member for the transmission screen has a major surface, and the length of each of the light diffusion portions is in the range of 2 to 450 μm in a direction perpendicular to the major surface of the screen member for the transmission screen.

8. The method as claimed in claim 1, wherein the screen member for the transmission screen has a major surface, and a focal point of each of the lens portions is located at a substantially central portion of the corresponding light diffusion portion in a direction perpendicular to the major surface of the screen member for the transmission screen.

9. The method as claimed in claim 1, wherein the lens substrate is manufactured using a substrate provided with concave portions corresponding to the plurality of lens portions of the lens substrate.

10. The method as claimed in claim 1, wherein the light incident face of the lens substrate has a usable area where the plurality of lens portions are formed, in which the ratio of the total area occupied by the lens portions with respect to the usable are of the lens substrate when viewed from the top of the light incident face of the lens substrate is 90% or more.

11. The method as claimed in claim 1, wherein each of the lens portions is formed into a microlens.

12. The method as claimed in claim 11, wherein the plurality of microlenses are formed so as to be arranged in a random manner when viewed from the top of the light incident face of the lens substrate.

13. The method as claimed in claim 11, wherein curvature radii of the plurality of microlenses are substantially the same as each other.

14. The method as claimed in claim 11, wherein the diameter of each of the microlenses is in the range of 10 to 500 μm.

15. The method as claimed in claim 1, wherein the diameter of each of the openings is in the range of 9 to 500 μm.

16. A screen member for a transmission screen manufactured using the method defined by claim 1.

17. A transmission screen comprising a screen member for a transmission screen defined by claim 16.

18. The transmission screen as claimed in claim 17, further comprising a Fresnel lens portion with a plurality of Fresnel lenses, the Fresnel lens portion having an emission face and the plurality of Fresnel lenses being formed in the emission face wherein the transmission screen is arranged on the side of the emission face of the Fresnel lens portion.

19. A rear projection with a transmission screen, the transmission screen comprising the screen member for a transmission screen defined by claim 17.

20. A rear projection comprising the screen member for a transmission screen defined by claim 16.

21. The rear projection as claimed in claim 20, further comprising:

a projection optical unit; and a light guiding mirror.

22. The method as claimed in claim 1, wherein a composition of the material constructing the second layer is different from a composition of the material constructing the lens substrate.

23. The method as claimed in claim 1, wherein the material constructing the second layer further includes diffusion media in addition to the negative photopolymer.

* * * * *